(12) United States Patent
Li et al.

(10) Patent No.: US 11,736,170 B2
(45) Date of Patent: *Aug. 22, 2023

(54) DATA TRANSMISSION METHOD, TERMINAL DEVICE, AND NETWORK DEVICE

(71) Applicant: HUAWEI TECHNOLOGIES CO., LTD., Guangdong (CN)

(72) Inventors: Xueru Li, Beijing (CN); Ruiqi Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,349

(22) Filed: May 16, 2022

(65) Prior Publication Data

US 2022/0385435 A1    Dec. 1, 2022

Related U.S. Application Data

(63) Continuation of application No. 16/714,244, filed on Dec. 13, 2019, now Pat. No. 11,349,541, which is a
(Continued)

(30) Foreign Application Priority Data

Sep. 30, 2017    (CN) .......................... 201710940769.5

(51) Int. Cl.
*H04B 7/06*    (2006.01)
*H04L 5/00*    (2006.01)
(Continued)

(52) U.S. Cl.
CPC ......... *H04B 7/0626* (2013.01); *H04B 7/0486* (2013.01); *H04B 7/0632* (2013.01);
(Continued)

(58) Field of Classification Search
CPC .. H04B 7/0626; H04B 7/0639; H04B 7/0632; H04B 7/0486; H04L 5/0051
See application file for complete search history.

(56) References Cited

U.S. PATENT DOCUMENTS

| 2012/0039252 A1* | 2/2012 | Damnjanovic | ....... H04L 1/0026 370/328 |
| 2012/0176939 A1 | 7/2012 | Qu et al. | |

(Continued)

FOREIGN PATENT DOCUMENTS

| CN | 102013954 | 4/2011 |
| CN | 102201897 | 9/2011 |

(Continued)

OTHER PUBLICATIONS

Samsung et al., WF for Open Issues on CSI Reporting, 3GPP TSG-RAN WG1 NR-AH3, Nagoya, Japan, Sep. 18-21, 2017, R1-1716901. (Year: 2017).*

(Continued)

*Primary Examiner* — Shailendra Kumar
(74) *Attorney, Agent, or Firm* — Fish & Richardson P.C.

(57) ABSTRACT

This application provides a data transmission method, a terminal device, and a network device. The method includes: determining, by a terminal device, reference information; and sending, by the terminal device, second channel state information (CSI) based on a comparison result of the reference information and a status parameter, where the second CSI includes all parameters in first CSI or includes some parameters in the first CSI, the first CSI is CSI that needs to be reported and that is configured by a network device for the terminal device, and the status parameter includes at least one of a transmission parameter of uplink data, a parameter in the first CSI, and a transmission parameter of the first CSI. The data transmission method, the
(Continued)

terminal device, and the network device in embodiments of this application help improve transmission performance of CSI.

16 Claims, 3 Drawing Sheets

Related U.S. Application Data continuation of application No. PCT/CN2018/091683, filed on Jun. 15, 2018.

(51) Int. Cl.
   *H04W 24/10* (2009.01)
   *H04B 7/0456* (2017.01)

(52) U.S. Cl.
   CPC ......... *H04B 7/0639* (2013.01); *H04L 5/0051* (2013.01); *H04L 5/0057* (2013.01); *H04W 24/10* (2013.01)

(56) References Cited

U.S. PATENT DOCUMENTS

| | | | | |
|---|---|---|---|---|
| 2012/0327785 | A1* | 12/2012 | Zhang | H04B 7/0639 370/241 |
| 2013/0077581 | A1 | 3/2013 | Lee et al. | |
| 2014/0044083 | A1* | 2/2014 | Kim | H04L 5/0064 370/329 |
| 2014/0169204 | A1 | 6/2014 | Cheng et al. | |
| 2016/0149629 | A1* | 5/2016 | Zhang | H04L 1/0027 370/329 |
| 2017/0244533 | A1 | 8/2017 | Onggosanusi et al. | |
| 2018/0062724 | A1 | 3/2018 | Onggosanusi et al. | |
| 2019/0053084 | A1 | 2/2019 | Hosseini et al. | |
| 2019/0141677 | A1 | 5/2019 | Harrison et al. | |
| 2019/0349057 | A1 | 11/2019 | Davydov et al. | |

FOREIGN PATENT DOCUMENTS

| | | |
|---|---|---|
| CN | 102255694 | 11/2011 |
| CN | 102938680 | 2/2013 |
| CN | 103314614 | 9/2013 |
| CN | 103582003 | 2/2014 |
| CN | 104253674 | 12/2014 |
| CN | 106411465 | 2/2017 |
| JP | 2017063274 | 3/2017 |
| WO | 2012151065 | 11/2012 |

OTHER PUBLICATIONS

Samsung, Summary of Email Discussions on UCI Coding, 3GPP TSG RAN WG1 #82bis, Malmo, Sweden, Oct. 5-9, 2015, R1-155446. (Year: 2015).*
3rd Generation Partnership Project; Technical Specification Group Radio Access Network; NR; Physical channels and modulation (Release 15), 3GPP TS 38.211 V1.0.0 (Sep. 2017) (Year: 2017).*
Samsung et al., WF on CSI Format Design, 3GPP TSG RAN WG1 Meeting #90, Prague, P.R. Czechia, Aug. 21-25, 2017, R1-1715288 (Year: 2017).*
3GPP TS 38.211 V1.0.0 (Sep. 2017), "3rd Generation Partnership Project, Technical Specification Group Radio Access Network, NR, Physical channels and modulation (Release 15)," Sep. 2017, 37 pages.
3GPP TS 38.212 V1.0.0 (Sep. 2017), "3rd Generation Partnership Project, Technical Specification Group Radio Access Network, NR, Multiplexing and channel coding (Release 15)," Sep. 2017, 28 pages.
3GPP TS 38.214 V1.0.0 (Sep. 2017), "3rd Generation Partnership Project, Technical Specification Group Radio Access Network, NR, Physical layer procedures for data (Release 15)," Sep. 2017, 32 pages.
CATT, "Considerations on CSI reporting [online]," 3GPP TSG RAN WG1 adhoc_NR_AH_1709, R1-1715800, Nagoya, Japan, Sep. 18-21, 2017, 7 pages.
EPO Communication pursuant to Article 94(3) EPC issued in European Application No. 18862491.0 dated May 28, 2021, 9 pages.
Ericsson, "On CSI reporting [online]," 3GPP TSG RAN WG1 adhoc_NR_AH_1709, R1-1716349, Nagoya, Japan, Sep. 18-21, 2017, 10 pages.
Extended European Search Report issued in European Application No. 18862491.0 dated Jul. 23, 2020, 14 pages.
Huawei et al., "Remaining issues for CSI reporting," 3GPP TSG RAN WG1 Meeting #91, R1-1719425, Reno, UAS, Nov. 27-Dec. 1, 2017, 9 pages.
Huawei, "Partial reciprocity based CSI acquisition mechanism." 3GPP TSG RAN WG1 NR Ad-Hoc#3, R1-1715722, Nagoya, Japan, Sep. 18-21, 2017, 6 pages.
Office Action issued in Chinese Application No. 201880000851.2 dated Jan. 6, 2020, 19 pages (With English Translation).
Office Action issued in Chinese Application No. 201910342973.6 dated Dec. 24, 2019, 12 pages (With English Translation).
Office Action issued in Japanese Application No. 2020-518483 dated Apr. 20, 2021, 7 pages (with English translation).
PCT International Search Report and Written Opinion in International Application No. PCT/CN2018/091683, dated Aug. 29, 2018, 11 pages (With Partial English Translation).
Samsung et al., "WF on CSI Format Design," 3GPP TSG RAN WG1 Meeting #90, R1-1715288, Prague, Czechia, Aug. 21-25, 2017, 5 pages.
Samsung et al., "WF for Open Issues on CSI Reporting," 3GPP TSG-RAN WG1 NR-AH3, R1-1716901, Nagoya, Japan, Sep. 18-21, 2017, 19 pages.
Samsung, "Summary of Email Discussions on UCI Coding," 3GPP TSG RAN WG1 #82bis, R1-155446, Malmo, Sweden, Oct. 5-9, 2015, 6 pages.
ZTE et al., "Remaining details on CSI reporting," 3GPP TSG RAN WG1 Meeting NR #3, R1-1715439, Nagoya, Japan, Sep. 18-21, 2017, 8 pages.
ZTE et al., "Remaining details on CSI reporting," 3GPP TSG RAN WG1 Meeting NR #3, R1-1715489, Nagoya, Japan, Sep. 18-21, 2017, 8 pages.
3GPP TS 38.331 V0.1.0, "3rd Generation Partnership Project; Technical Specification Group Radio Access Network; NR; Radio Resource Control (RRC); Protocol Specification (Release 15)," Oct. 2017, 42 pages.

* cited by examiner

DATA TRANSMISSION METHOD, TERMINAL DEVICE, AND NETWORK DEVICE

CROSS-REFERENCE TO RELATED APPLICATIONS

This application is a continuation of U.S. patent application Ser. No. 16/714,244, filed on Dec. 13, 2019, which is a continuation of International Application No. PCT/CN2018/091683, filed on Jun. 15, 2018 which claims priority to Chinese Patent Application No. 201710940769.5, filed on Sep. 30, 2017. All of the afore-mentioned patent applications are hereby incorporated by reference in their entireties.

TECHNICAL FIELD

This application relates to the communications field, and in particular, to a data transmission method, a terminal device, and a network device in the communications field.

BACKGROUND

Usually, a network device may send a downlink control information (downlink control information, DCI) in an $(n-k)^{th}$ subframe, to trigger aperiodic channel state information (CSI) reporting and/or uplink data transmission of a terminal device, where both n and k are positive integers, and n is greater than k. The triggered CSI reporting and uplink data transmission are carried in an uplink channel in an $n^{th}$ subframe. Resource allocation (RA) of the uplink channel in the $n^{th}$ subframe is completed by a resource allocation field in DCI in the $(n-k)^{th}$ subframe. If the terminal device transmits no data in the $n^{th}$ subframe, the uplink channel may be used to carry only CSI. If the terminal device also needs to transmit uplink data in the $n^{th}$ subframe, a resource of the uplink channel needs to carry both CSI and uplink data. The CSI and the uplink data share a data resource, and an information bit quantity of the CSI is related to a rank indication (RI) reported by the terminal device. Therefore, the network device cannot determine, during resource allocation, a quantity of resources that the CSI should occupy, and a quantity of resources occupied by the uplink data. Therefore, uplink channel resources respectively occupied by the uplink data and the CSI are changing, and are dynamically adjusted depending on an actual information bit quantity of the CSI.

The CSI fed back by the terminal device to the network device usually includes parameters such as a rank indication (RI), a precoding matrix indicator (PMI), and a channel quality indicator (CQI). An information bit quantity of the PMI and an information bit quantity of the CQI may change as the RI changes. Therefore, to ensure that both a maximum quantity of PMI bits and a maximum quantity of CQI bits can be carried in the uplink channel together with the uplink data, the network device may always allocate a resource based on a maximum CSI bit quantity. However, the CSI reporting triggered by the network device may be high-precision CSI reporting, and bit quantities of high-precision CSI may differ by one time with different RIs. For example, when RI=1, the PMI and/or the CQI are/is approximately 300 bits, and when RI=2, the PMI and/or the CQI are/is close to 600 bits. In this case, if the network device always allocates an uplink channel resource based on a maximum bit quantity (in other words, RI=2), but the terminal device frequently reports CSI for which RI=1, the uplink channel resource is wasted.

Therefore, the network device may not allocate a resource based on a maximum CSI bit quantity corresponding to an RI, but estimates, based on prior information, an RI reported by the terminal device. In this case, an uplink channel resource allocated by the network device to the terminal device is unnecessarily capable of satisfying an uplink channel resource needed by CSI reported by the terminal device. How the terminal device reports CSI by using a limited uplink channel resource allocated by the network device to the terminal device has become a problem that is to be resolved urgently.

SUMMARY

This application provides a data transmission method, a terminal device, and a network device, to help improve transmission performance of CSI.

According to a first aspect, a data transmission method is provided. The method includes: determining, by a terminal device, reference information; and sending, by the terminal device, second channel state information (CSI) based on a comparison result of the reference information and a status parameter, where the second CSI includes all parameters in first CSI or includes some parameters in the first CSI, the first CSI is CSI that needs to be reported and that is configured by a network device for the terminal device, and the status parameter includes at least one of a transmission parameter of uplink data, a parameter in the first CSI, and a transmission parameter of the first CSI.

Specifically, the terminal device may determine the first CSI that needs to be reported and that is configured by the network device for the terminal device. However, an uplink channel resource configured by the network device for the terminal device may be insufficient. Therefore, in an embodiment of this application, CSI actually reported by the terminal device is the second CSI, and the second CSI includes all or part of parameters in the first CSI. Before reporting to the network device, the terminal device may first determine the reference information, and determine, based on the reference information, that all parameters in the first CSI need to be reported or some parameters in the first CSI need to be reported. In other words, the terminal device compares the status parameter with the reference information, and determines a parameter of the finally reported second CSI based on the obtained comparison result.

It should be understood that, the reference information determined by the terminal device may be determined by the terminal device based on a predefined rule or may be determined by the terminal device based on a configuration of the network device. In other words, the reference information may be predefined, or may be configured by the network device for the terminal device by using signaling. This is not limited in this embodiment of this application.

In this specification, parameters in the first CSI are parameters included in the first CSI, for example, parameters such as an RI, a PMI, and a CQI, and transmission parameters of the first CSI are parameters used to indicate transmission situations of the first CSI, for example, a quantity of resource elements (REs) occupied by the first CSI on an uplink channel, a quantity of modulation symbols of the first CSI, an information bit quantity of the first CSI, and a bit quantity of the first CSI after channel coding is performed. Likewise, transmission parameters of the uplink data may be parameters used to indicate transmission situations of the uplink data, for example, a channel coding code rate of the uplink data, a quantity of REs occupied by the uplink data on the uplink channel, a quantity of modulation symbols of the uplink data, and a ratio of the quantity of REs occupied by the uplink data on the uplink channel to a total quantity of REs included in the uplink channel.

According to the data transmission method in this embodiment of this application, after determining, based on the reference information and the CSI that needs to be reported and that is configured by the network device for the terminal device, CSI that can be actually reported, the terminal device reports the CSI, so that the terminal device can properly use a limited uplink channel resource allocated by the network device to the terminal device, thereby improving transmission performance of the CSI.

With reference to the first aspect, in some implementations of the first aspect, the reference information is used to indicate at least one of a threshold of the rank indication (RI) and a threshold of a transmission parameter of the second CSI, where the transmission parameter of the second CSI includes at least one of the following parameters: the quantity of resource elements (REs) occupied by the second CSI on the uplink channel, a quantity of modulation symbols of the second CSI, an information bit quantity of the second CSI, and a bit quantity of the second CSI after channel coding is performed.

It should be understood that, the foregoing indication may be a direct indication or may be an indirect indication (which is a corresponding threshold that can be derived by using a mapping relationship). This is not limited in this embodiment of this application. For example, for the direct indication, the reference information may directly be that the threshold of the RI is 2. For the indirect indication, the reference information may be a threshold identifier of the RI, and the terminal device may determine, based on the threshold identifier, that the threshold of the RI is 2. All these situations shall fall within the protection scope of the embodiments of this application.

With reference to the first aspect, in some implementations of the first aspect, the reference information is used to indicate the threshold of the RI, and the status parameter is an RI in the first CSI. If the RI in the first CSI is greater than the threshold of the RI, the second CSI includes some parameters in the first CSI, or if the RI in the first CSI is less than or equal to the threshold of the RI, the second CSI includes all parameters in the first CSI.

It should be understood that, because the second CSI includes all parameters or some parameters in the first CSI, the RI in the first CSI is the same as an RI in the second CSI in this embodiment of this application. It should be further understood that, if the RI in the first CSI is equal to the threshold of the RI, the second CSI may alternatively include some parameters in the first CSI. This is not limited in this embodiment of this application.

With reference to the first aspect, in some implementations of the first aspect, the reference information is used to indicate a first threshold of the quantity of REs occupied by the second CSI on the uplink channel, and the status parameter is a quantity of REs occupied by the first CSI on the uplink channel; and if the quantity of REs occupied by the first CSI on the uplink channel is greater than the first threshold, the second CSI includes some parameters in the first CSI, or if the quantity of REs occupied by the first CSI on the uplink channel is less than or equal to the first threshold, the second CSI includes all parameters in the first CSI.

It should be understood that, the terminal device may directly determine the quantity of REs occupied by the first CSI on the uplink channel, or may calculate, based on the RI in the first CSI, the quantity of REs occupied by the first CSI on the uplink channel. It should be further understood that, if the quantity of REs occupied by the first CSI on the uplink channel is equal to the first threshold, the second CSI may alternatively include some parameters in the first CSI. This is not limited in this embodiment of this application.

With reference to the first aspect, in some implementations of the first aspect, the reference information is used to indicate a second threshold of the quantity of modulation symbols of the second CSI, and the status parameter is the quantity of modulation symbols of the first CSI; and if the quantity of modulation symbols of the first CSI is greater than the second threshold, the second CSI includes some parameters in the first CSI, or if the quantity of modulation symbols of the first CSI is less than or equal to the second threshold, the second CSI includes all parameters in the first CSI.

It should be understood that, the terminal device may directly determine the quantity of modulation symbols of the first CSI, or may calculate, based on the RI in the first CSI, the quantity of modulation symbols of the first CSI. It should be further understood that, if the quantity of modulation symbols of the first CSI is equal to the second threshold, the second CSI may alternatively include some parameters in the first CSI. This is not limited in this embodiment of this application.

With reference to the first aspect, in some implementations of the first aspect, the reference information is used to indicate a third threshold of an information bit quantity of the second CSI, and the status parameter is an information bit quantity of the first CSI; and if the information bit quantity of the first CSI is greater than the third threshold, the second CSI includes some parameters in the first CSI, or if the information bit quantity of the first CSI is less than or equal to the third threshold, the second CSI includes all parameters in the first CSI.

It should be understood that, the information bit quantity of the first CSI is a bit quantity of the first CSI before channel coding is performed. The terminal device may directly determine the information bit quantity of the first CSI, or may calculate, based on the RI in the first CSI, the information bit quantity of the first CSI. It should be further understood that, if the information bit quantity of the first CSI is equal to the third threshold, the second CSI may alternatively include some parameters in the first CSI. This is not limited in this embodiment of this application.

With reference to the first aspect, in some implementations of the first aspect, the reference information is used to indicate a fourth threshold of a bit quantity of the second CSI after channel coding is performed, and the status parameter is a bit quantity of the first CSI after channel coding is performed; and if the bit quantity of the first CSI after channel coding is performed is greater than the fourth threshold, the second CSI includes some parameters in the first CSI, or if the bit quantity of the first CSI after channel coding is performed is less than or equal to the fourth threshold, the second CSI includes all parameters in the first CSI.

It should be understood that, the terminal device may directly determine the bit quantity of the first CSI after channel coding is performed, or may calculate, based on the RI in the first CSI, the bit quantity of the first CSI after channel coding is performed. It should be further understood that, if the bit quantity of the first CSI after channel coding is performed is equal to the fourth threshold, the second CSI may alternatively include some parameters in the first CSI. This is not limited in this embodiment of this application.

With reference to the first aspect, in some implementations of the first aspect, the sending, by the terminal device, second CSI includes: sending, by the terminal device, the second CSI and the uplink data, where the uplink data and the second CSI are carried on a same uplink channel.

Specifically, the terminal device may add the second CSI to the uplink channel together with the uplink data and send the second CSI and the uplink data to the network device. In this case, the uplink channel resource allocated by the network device is shared by the second CSI and the uplink data.

With reference to the first aspect, in some implementations of the first aspect, the transmission parameter of the second CSI further includes: a ratio of the quantity of REs occupied by the second CSI on the uplink channel to a total quantity of REs included in the uplink channel.

With reference to the first aspect, in some implementations of the first aspect, the reference information is used to indicate a fifth threshold of the ratio of the quantity of REs occupied by the second CSI on the uplink channel to the total quantity of REs included in the uplink channel, and the status parameter is a ratio of a quantity of REs occupied by the first CSI on the uplink channel to the total quantity of REs included in the uplink channel; and if the ratio of the quantity of REs occupied by the first CSI on the uplink channel to the total quantity of REs included in the uplink channel is greater than the fifth threshold, the second CSI includes some parameters in the first CSI, or if the ratio of the quantity of REs occupied by the first CSI on the uplink channel to the total quantity of REs included in the uplink channel is less than or equal to the fifth threshold, the second CSI includes all parameters in the first CSI.

It should be understood that, resource elements of the uplink channel may be collectively referred to as a resource element set, and the ratio of the quantity of REs occupied by the first CSI on the uplink channel to the total quantity of REs included in the uplink channel may also be referred to as a ratio of a quantity of REs of the first CSI in a resource element set to a total quantity of REs in the resource element set. This is not limited in this embodiment of this application. The terminal device may directly determine the ratio of the quantity of REs occupied by the first CSI on the uplink channel to the total quantity of REs included in the uplink channel, or may calculate, based on the RI in the first CSI, the ratio of the quantity of REs occupied by the first CSI on the uplink channel to the total quantity of REs included in the uplink channel. It should be further understood that, if the ratio of the quantity of REs occupied by the first CSI on the uplink channel to the total quantity of REs included in the uplink channel is equal to the fifth threshold, the second CSI may alternatively include some parameters in the first CSI. This is not limited in this embodiment of this application.

With reference to the first aspect, in some implementations of the first aspect, the reference information is used to indicate a threshold of the transmission parameter of the uplink data; and the transmission parameter of the uplink data includes at least one of the following parameters: a channel coding code rate of the uplink data, a quantity of REs occupied by the uplink data on the uplink channel, a quantity of modulation symbols of the uplink data, and a ratio of the quantity of REs occupied by the uplink data on the uplink channel to a total quantity of REs included in the uplink channel.

It should be understood that, the foregoing indication may be a direct indication or may be an indirect indication (which is a corresponding threshold that can be derived by using a mapping relationship). This is not limited in this embodiment of this application.

With reference to the first aspect, in some implementations of the first aspect, the reference information is used to indicate a sixth threshold of the channel coding code rate of the uplink data, and the status parameter is the channel coding code rate of the uplink data; and if the channel coding code rate of the uplink data is greater than the sixth threshold, the second CSI includes some parameters in the first CSI, or if the channel coding code rate of the uplink data is less than or equal to the sixth threshold, the second CSI includes all parameters in the first CSI.

It should be understood that, the terminal device may calculate the channel coding code rate of the uplink data based on resource allocation information and the parameters in the first CSI. It should be further understood that, if the channel coding code rate of the uplink data is equal to the sixth threshold, the second CSI may alternatively include some parameters in the first CSI. This is not limited in this embodiment of this application.

With reference to the first aspect, in some implementations of the first aspect, the reference information is used to indicate a seventh threshold of the quantity of REs occupied by the uplink data on the uplink channel, and the status parameter is the quantity of REs occupied by the uplink data on the uplink channel; and if the quantity of REs occupied by the uplink data on the uplink channel is less than the seventh threshold, the second CSI includes some parameters in the first CSI, or if the quantity of REs occupied by the uplink data on the uplink channel is greater than or equal to the seventh threshold, the second CSI includes all parameters in the first CSI.

It should be understood that, the terminal device may calculate, based on the resource allocation information and the parameters in the first CSI, the quantity of REs occupied by the uplink data on the uplink channel. It should be further understood that, if the quantity of REs occupied by the uplink data on the uplink channel is equal to the seventh threshold, the second CSI may alternatively include some parameters in the first CSI. This is not limited in this embodiment of this application.

With reference to the first aspect, in some implementations of the first aspect, the reference information is used to indicate an eighth threshold of the quantity of modulation symbols of the uplink data, and the status parameter is the quantity of modulation symbols of the uplink data; and if the quantity of modulation symbols of the uplink data is less than the eighth threshold, the second CSI includes some parameters in the first CSI, or if the quantity of modulation symbols of the uplink data is greater than or equal to the eighth threshold, the second CSI includes all parameters in the first CSI.

It should be understood that, the terminal device may calculate the quantity of modulation symbols of the uplink data based on the resource allocation information and the parameters in the first CSI. It should be further understood that, if the quantity of modulation symbols of the uplink data is equal to the eighth threshold, the second CSI may alternatively include some parameters in the first CSI. This is not limited in this embodiment of this application.

With reference to the first aspect, in some implementations of the first aspect, the reference information is used to indicate a ninth threshold of the ratio of the quantity of REs occupied by the uplink data on the uplink channel to the total quantity of REs included in the uplink channel, and the status parameter is the ratio of the quantity of REs occupied by the uplink data on the uplink channel to the total quantity of REs included in the uplink channel; and if the ratio of the quantity of REs occupied by the uplink data on the uplink channel to the total quantity of REs included in the uplink channel is less than the ninth threshold, the second CSI includes some parameters in the first CSI, or if the ratio of the quantity of REs occupied by the uplink data on the uplink channel to the total quantity of REs included in the uplink channel is greater than or equal to the ninth threshold, the second CSI includes all parameters in the first CSI.

It should be understood that, the terminal device may calculate, based on the resource allocation information and the parameters in the first CSI, the ratio of the quantity of REs occupied by the uplink data on the uplink channel to the total quantity of REs included in the uplink channel. It should be further understood that, if the ratio of the quantity of REs occupied by the uplink data on the uplink channel to the total quantity of REs included in the uplink channel is equal to the ninth threshold, the second CSI may alternatively include some parameters in the first CSI. This is not limited in this embodiment of this application. It should be further understood that, the reference information may indicate one or more thresholds.

With reference to the first aspect, in some implementations of the first aspect, before the sending, by the terminal device, second CSI, the method further includes: determining, by the terminal device based on the comparison result and priority information, whether to send the uplink data, where the priority information is used to indicate priorities of the second CSI and the uplink data, and the sending, by the terminal device, second CSI includes: sending, by the terminal device, the second CSI and the uplink data if the terminal device determines to send the uplink data.

Specifically, the terminal device may first determine priorities of CSI and the uplink data based on the priority information, and then determine whether the uplink data needs to be sent, in other words, determine, based on the priority information, to preferably discard some information in the first CSI or preferably discard the uplink data. It should be understood that, the priority information may be predefined, or may be configured by the network device for the terminal device by using signaling. This is not limited in this embodiment of this application.

With reference to the first aspect, in some implementations of the first aspect, the parameter in the first CSI includes: second frequency domain granularity parameters of M subbands and a first frequency domain granularity parameter, where the first frequency domain granularity parameter includes an RI, and the second frequency domain granularity parameters of the M subbands include a channel quality indicator (CQI) of each of the M subbands and/or a precoding matrix indicator (PMI) of the subband; and a parameter in the second CSI includes any one of the following: second frequency domain granularity parameters of N subbands and the first frequency domain granularity parameter; all or part of second frequency domain granularity parameters of each of the M subbands and the first frequency domain granularity parameter; and the first frequency domain granularity parameter, the CQI of each of the M subbands, and a PMI of each of the N subbands, where the M subbands include the N subbands, both M and N are integers greater than or equal to 1, and M is greater than N.

It should be understood that, the first frequency domain granularity parameter is also referred to as a broadband parameter and has a same value on the M subbands, and the second frequency domain granularity parameter is also referred to as a subband parameter and has a different value for each of the M subbands. Specifically, if the second CSI reported by the terminal device includes some parameters in the first CSI, the terminal device may select some parameters in the first CSI based on a predefined rule to perform reporting. For example, the terminal device may report only a proportion of parameters (for example, an RI, a broadband PMI, all subband CQIs, and a proportion of subband PMIs; an RI, a broadband PMI, and a proportion of subband PMIs and subband CQIs; an RI, a broadband PMI, a broadband CQI, a subband PMI and/or a subband CQI of the M subbands whose indexes are the highest; or an RI, and PMIs and/or CQIs corresponding to some DFT vectors) in the first CSI based on a default rule.

With reference to the first aspect, in some implementations of the first aspect, the reference information is predefined, or the reference information is configured by the network device for the terminal device by using signaling.

With reference to the first aspect, in some implementations of the first aspect, the signaling is any one of the following signaling: radio resource control (RRC) signaling, downlink control information (DCI) signaling, and a Media Access Control control element (MAC CE) signaling.

It should be understood that, using the RRC signaling to configure the reference information is applicable to a scenario in which the configuration of the reference information does not frequently change and is relatively stable, and bit overheads of signaling of a physical layer and a MAC layer may be greatly reduced. Using the DCI signaling to configure the reference information helps the terminal device perform fast detection, to ensure that the terminal device receives the reference information in a timely manner. However, using the MAC CE signaling to configure the reference information is applicable to a scenario in which the reference information changes relatively dynamically. A decoding speed of the MAC CE signaling is higher than that of the RRC signaling. Therefore, in such a scenario, the network device uses the MAC CE signaling to configure the reference information more efficiently.

According to a second aspect, another data transmission method is provided. The method includes: receiving, by a network device, a rank indication (RI) in second channel state information (CSI); and determining, by the network device based on a comparison result obtained by comparing a status parameter with reference information, at least one of a bit quantity of the second CSI and a quantity of resource elements (REs) occupied by the second CSI on an uplink channel, where the status parameter is determined based on the RI, the status parameter includes at least one of a transmission parameter of uplink data, a parameter in first CSI, and a transmission parameter of the first CSI, the first CSI is CSI that needs to be reported and that is configured by the network device for a terminal device, and the second CSI includes all parameters in the first CSI or includes some parameters in the first CSI.

According to the data transmission method in this embodiment of this application, after determining, based on the reference information and the CSI that needs to be reported and that is configured by the network device for the terminal device, CSI that can be actually reported, the terminal device reports the CSI, so that the terminal device can properly use a limited uplink channel resource allocated by the network device to the terminal device, thereby improving transmission performance of the CSI.

With reference to the second aspect, in some implementations of the second aspect, the reference information is used to indicate at least one of a threshold of the rank indication (RI) of the second CSI and a threshold of a transmission parameter of the second CSI, where the transmission parameter of the second CSI includes at least one of the following parameters: the quantity of resource elements (REs) occupied by the second CSI on the uplink channel, a quantity of modulation symbols of the second CSI, an information bit quantity of the second CSI, and a bit quantity of the second CSI after channel coding is performed.

With reference to the second aspect, in some implementations of the second aspect, the reference information is used to indicate the threshold of the RI, and the status parameter is the RI; and if the RI is greater than the threshold of the RI, the second CSI includes some parameters in the first CSI; or if the RI is less than or equal to the threshold of the RI, the second CSI includes all parameters in the first CSI.

With reference to the second aspect, in some implementations of the second aspect, the reference information is used to indicate a first threshold of the quantity of REs occupied by the second CSI on the uplink channel, and the status parameter is a quantity of REs occupied by the first CSI on the uplink channel; and if the quantity of REs occupied by the first CSI on the uplink channel is greater than the first threshold, the second CSI includes some parameters in the first CSI, or if the quantity of REs occupied by the first CSI on the uplink channel is less than or equal to the first threshold, the second CSI includes all parameters in the first CSI.

With reference to the second aspect, in some implementations of the second aspect, the reference information is used to indicate a second threshold of the quantity of modulation symbols of the second CSI, and the status parameter is the quantity of modulation symbols of the first CSI; and if the quantity of modulation symbols of the first CSI is greater than the second threshold, the second CSI includes some parameters in the first CSI, or if the quantity of modulation symbols of the first CSI is less than or equal to the second threshold, the second CSI includes all parameters in the first CSI.

With reference to the second aspect, in some implementations of the second aspect, the reference information is used to indicate a third threshold of an information bit quantity of the second CSI, and the status parameter is an information bit quantity of the first CSI; and if the information bit quantity of the first CSI is greater than the third threshold, the second CSI includes some parameters in the first CSI, or if the information bit quantity of the first CSI is less than or equal to the third threshold, the second CSI includes all parameters in the first CSI.

With reference to the second aspect, in some implementations of the second aspect, the reference information is used to indicate a fourth threshold of a bit quantity of the second CSI after channel coding is performed, and the status parameter is a bit quantity of the first CSI after channel coding is performed, and if the bit quantity of the first CSI after channel coding is performed is greater than the fourth threshold, the second CSI includes some parameters in the first CSI, or if the bit quantity of the first CSI after channel coding is performed is less than or equal to the fourth threshold, the second CSI includes all parameters in the first CSI.

With reference to the second aspect, in some implementations of the second aspect, the receiving, by a network device, a rank indication (RI) in second CSI includes: receiving, by the network device, the second CSI and the uplink data, where the uplink data and the second CSI are carried on a same uplink channel.

With reference to the second aspect, in some implementations of the second aspect, the transmission parameter of the second CSI further includes: a ratio of the quantity of REs occupied by the second CSI on the uplink channel to a total quantity of REs included in the uplink channel.

With reference to the second aspect, in some implementations of the second aspect, the reference information is used to indicate a fifth threshold of the ratio of the quantity of REs occupied by the second CSI on the uplink channel to the total quantity of REs included in the uplink channel, and the status parameter is a ratio of a quantity of REs occupied by the first CSI on the uplink channel to the total quantity of REs included in the uplink channel; and if the ratio of the quantity of REs occupied by the first CSI on the uplink channel to the total quantity of REs included in the uplink channel is greater than the fifth threshold, the second CSI includes some parameters in the first CSI, or if the ratio of the quantity of REs occupied by the first CSI on the uplink channel to the total quantity of REs included in the uplink channel is less than or equal to the fifth threshold, the second CSI includes all parameters in the first CSI.

With reference to the second aspect, in some implementations of the second aspect, the reference information is used to indicate a threshold of the transmission parameter of the uplink data; and the transmission parameter of the uplink data includes at least one of the following parameters: a channel coding code rate of the uplink data, a quantity of REs occupied by the uplink data on the uplink channel, a quantity of modulation symbols of the uplink data, and a ratio of the quantity of REs occupied by the uplink data on the uplink channel to a total quantity of REs included in the uplink channel.

With reference to the second aspect, in some implementations of the second aspect, the reference information is used to indicate a sixth threshold of the channel coding code rate of the uplink data, and the status parameter is the channel coding code rate of the uplink data; and if the channel coding code rate of the uplink data is greater than the sixth threshold, the second CSI includes some parameters in the first CSI, or if the channel coding code rate of the uplink data is less than or equal to the sixth threshold, the second CSI includes all parameters in the first CSI.

With reference to the second aspect, in some implementations of the second aspect, the reference information is used to indicate a seventh threshold of the quantity of REs occupied by the uplink data on the uplink channel, and the status parameter is the quantity of REs occupied by the uplink data on the uplink channel; and if the quantity of REs occupied by the uplink data on the uplink channel is less than the seventh threshold, the second CSI includes some parameters in the first CSI, or if the quantity of REs occupied by the uplink data on the uplink channel is greater than or equal to the seventh threshold, the second CSI includes all parameters in the first CSI.

With reference to the second aspect, in some implementations of the second aspect, the reference information is used to indicate an eighth threshold of the quantity of modulation symbols of the uplink data, and the status parameter is the quantity of modulation symbols of the uplink data; and if the quantity of modulation symbols of the uplink data is less than the eighth threshold, the second CSI includes some parameters in the first CSI, or if the quantity of modulation symbols of the uplink data is greater than or equal to the eighth threshold, the second CSI includes all parameters in the first CSI.

With reference to the second aspect, in some implementations of the second aspect, the reference information is used to indicate a ninth threshold of the ratio of the quantity of REs occupied by the uplink data on the uplink channel to the total quantity of REs included in the uplink channel, and the status parameter is the ratio of the quantity of REs occupied by the uplink data on the uplink channel to the total quantity of REs included in the uplink channel; and if the ratio of the quantity of REs occupied by the uplink data on the uplink channel to the total quantity of REs included in the uplink channel is less than the ninth threshold, the second CSI includes some parameters in the first CSI, or if the ratio of the quantity of REs occupied by the uplink data on the uplink channel to the total quantity of REs included in the uplink channel is greater than or equal to the ninth threshold, the second CSI includes all parameters in the first CSI.

With reference to the second aspect, in some implementations of the second aspect, the parameter in the first CSI includes: second frequency domain granularity parameters of M subbands and a first frequency domain granularity parameter, where the first frequency domain granularity parameter includes an RI, and the second frequency domain granularity parameters of the M subbands include a channel quality indicator (CQI) of each of the M subbands and/or a precoding matrix indicator (PMI) of the subband; and a parameter in the second CSI includes any one of the following: second frequency domain granularity parameters of N subbands and the first frequency domain granularity parameter; all or part of second frequency domain granularity parameters of each of the M subbands and the first frequency domain granularity parameter; and the first frequency domain granularity parameter, the CQI of each of the M subbands, and a PMI of each of the N subbands, where the M subbands include the N subbands, both M and N are integers greater than or equal to 1, and M is greater than N.

With reference to the second aspect, in some implementations of the second aspect, the reference information is predefined, or the method further includes: sending, by the network device, the reference information to the terminal device by using signaling.

With reference to the second aspect, in some implementations of the second aspect, the signaling is any one of the following signaling: radio resource control RRC signaling, downlink control information (DCI) signaling, and a Media Access Control control element (MAC CE) signaling.

According to a third aspect, a terminal device is provided. The terminal device is configured to perform the method according to the first aspect or any possible implementation of the first aspect. Specifically, the terminal device includes a unit configured to perform the method according to the first aspect or any possible implementation of the first aspect.

According to a fourth aspect, a network device is provided. The network device is configured to perform the method according to the second aspect or any possible implementation of the second aspect. Specifically, the network device includes a unit configured to perform the method according to the second aspect or any possible implementation of the second aspect.

According to a fifth aspect, a terminal device is provided. The terminal device includes: a transceiver, a memory, and a processor. The transceiver, the memory, and the processor communicate with each other by using an internal connection path, the memory is configured to store an instruction, the processor is configured to execute the instruction stored in the memory, so as to control a receiver to receive a signal and control a transmitter to send a signal, and when the processor executes the instruction stored in the memory, the execution enables the processor to perform the method according to the first aspect or any possible implementation of the first aspect.

According to a sixth aspect, a network device is provided. The network device includes: a transceiver, a memory, and a processor. The transceiver, the memory, and the processor communicate with each other by using an internal connection path, the memory is configured to store an instruction, the processor is configured to execute the instruction stored in the memory, so as to control a receiver to receive a signal and control a transmitter to send a signal, and when the processor executes the instruction stored in the memory, the execution enables the processor to perform the method according to the second aspect or any possible implementation of the second aspect.

According to a seventh aspect, a data transmission system is provided. The system includes the terminal device according to the third aspect or any possible implementation of the third aspect and the network device according to the fourth aspect or any possible implementation of the fourth aspect; or the system includes the terminal device according to the fifth aspect or any possible implementation of the fifth aspect and the network device according to the sixth aspect or any possible implementation of the sixth aspect.

According to an eighth aspect, a computer program product is provided. The computer program product includes computer program code, and when the computer program code is run by a network device, the network device performs the method according to the first aspect or any possible implementation of the first aspect.

According to a ninth aspect, a computer program product is provided. The computer program product includes computer program code, and when the computer program code is run by a terminal device, the terminal device performs the method according to the second aspect or any possible implementation of the second aspect.

According to a tenth aspect, a chip is provided. The chip includes: an input interface, an output interface, and at least one processor, and optionally may further include a memory. The input interface, the output interface, the processor, and the memory are connected to each other by using an internal connection path, the processor and the memory may be connected to each other by using the internal connection path or an external path, the processor is configured to execute code in the memory, and when the code is executed, the processor is configured to perform the method according to the first aspect or any possible implementation of the first aspect.

According to an eleventh aspect, a chip is provided. The chip includes: an input interface, an output interface, and at least one processor, and optionally may further include a memory. The input interface, the output interface, the processor, and the memory are connected to each other by using an internal connection path, the processor and the memory may be connected to each other by using the internal connection path or an external path, the processor is configured to execute code in the memory, and when the code is executed, the processor is configured to perform the method according to the second aspect or any possible implementation of the second aspect.

According to a twelfth aspect, a processing apparatus is provided. The processing apparatus includes: a memory; and a processor, configured to read an instruction stored in the memory, to perform any one of the foregoing methods, where steps related to transmission and receiving should be understood as being performed by the processor by using a transceiver.

The memory may be a non-transitory memory such as a read-only memory (ROM). The memory and the processor may be integrated on a same chip, or may be separately disposed on different chips. A type of the memory and a manner of disposing the memory and the processor are not limited in this embodiment of this application.

According to a thirteenth aspect, a computer readable medium is provided. The computer readable medium is configured to store a computer program, where the computer program includes an instruction used to perform the method according to the first aspect or any possible implementation of the first aspect.

According to a fourteenth aspect, a computer readable medium is provided. The computer readable medium is configured to store a computer program, where the computer program includes an instruction used to perform the method according to the second aspect or any possible implementation of the second aspect.

The computer readable storage medium is non-transitory.

According to a fifteenth aspect, a computer program product including an instruction is provided. When the computer program product runs on a computer, the computer performs any one of the foregoing methods.

According to the data transmission method, the terminal device, and the network device in the embodiments of this application, after determining, based on the reference information and the CSI that needs to be reported and that is configured by the network device for the terminal device, the CSI that can be actually reported, the terminal device reports the CSI, so that the terminal device can properly use the limited uplink channel resource allocated by the network device to the terminal device, thereby improving the transmission performance of the CSI.

DESCRIPTION OF EMBODIMENTS

Figure 1:
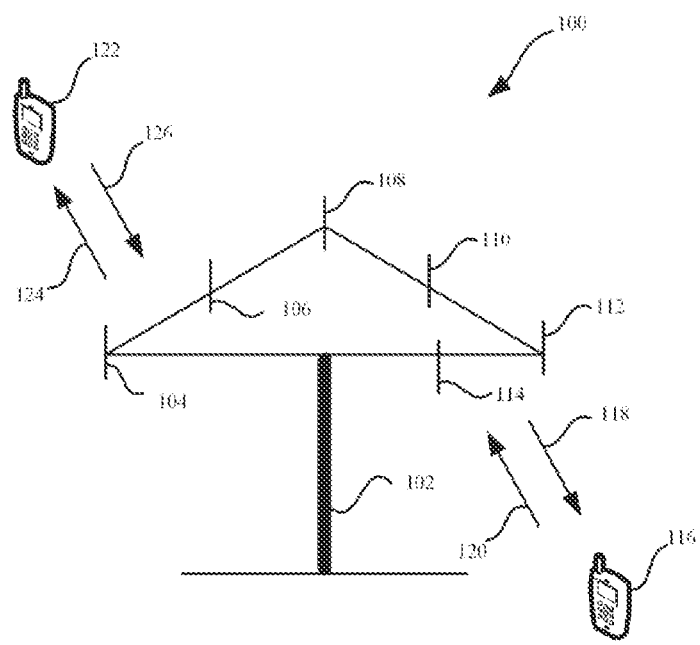
FIG. 1 is a schematic diagram of a communications system according to an embodiment of this application.

The following describes technical solutions of this application with reference to the accompanying drawings.

A next-generation wireless communications system that is currently at a research and development stage may also be referred to as a new radio (NR) system or a future 5th generation (5G) system. Latest research progress of a next-generation wireless communications standard indicates that, CSI may be sent from a receive end device to a transmit end device by using a physical uplink shared channel (PUSCH). A person skilled in the art should understand that, compared with a physical uplink control channel (PUCCH) mainly used to transmit control information, the PUSCH is mainly used to transmit data. Therefore, when transmitting CSI, the PUSCH may further transmit data or may not transmit data. For example, a PUSCH in an uplink subframe may transmit both CSI and data or may transmit only CSI but not transmit data. The CSI is usually included in uplink control information (UCI), and the UCI is transmitted by using the PUSCH.

A frequency band in the embodiments of this application may be referred to as carrier bandwidth, and may be considered as a broadband that further includes at least one bandwidth part. Each bandwidth part includes at least one contiguous subband, and each subband further includes a plurality of contiguous subcarriers.

Each bandwidth part may correspond to a group of system parameters (numerology), including, for example, but not limited to, a subcarrier spacing and a cyclic prefix (CP), and different bandwidth parts may correspond to different system parameters. Optionally, within a same transmission time interval (TTI), among a plurality of bandwidth parts, only one bandwidth part may be available, and other bandwidth parts are not available.

During CSI reporting, some or all subbands of a bandwidth part may be allocated and used as a CSI reporting bandwidth, so as to report CSI corresponding to the CSI reporting bandwidth. It is not difficult to understand that, the reporting bandwidth is a segment of bandwidth, the CSI corresponding to the bandwidth needs to be reported, and the bandwidth includes a plurality of subbands. The reporting bandwidth carries a reference signal that is used to perform channel sounding and that is sent by a transmit end device, for example, but not limited to, a cell-specific reference signal (CRS), a channel state information-reference signal (CSI-RS), or a demodulation reference signal (DMRS). Related technical content of the reference signal belongs to the prior art, and is not limited in the embodiments of this application. A receive end device may measure the reference signal, to obtain corresponding CSI.

During CSI reporting, CSI of the entire reporting bandwidth, namely, broadband CSI of the reporting bandwidth, may be reported, or CSI of at least one subband within the reporting bandwidth may be reported. Alternatively, the foregoing two reporting manners may be combined and used, or another reporting manner is used. For example, the reporting bandwidth includes a plurality of contiguous subbands. However, during specific implementation, subbands included in the reporting bandwidth may be not contiguous. For example, for six contiguous subbands in a bandwidth part: a subband 1 to a subband 6, the reporting bandwidth may include the subband 1, the subband 2, the subband 4, and the subband 6. During specific implementation, a frequency band may also be divided in another manner or based on a hierarchy. For example, in different division manners, quantities of subcarriers included in a subband may be different. A specific manner of dividing a frequency band is not limited in the embodiments of this application.

As described above, when channel sounding is performed, the receive end device obtains channel state information based on the reference signal (RS) transmitted by the transmit end device, and feeds back the obtained CSI to the transmit end device. The transmit end device may process a to-be-transmitted signal based on the CSI, and send a processed to-be-transmitted signal to the receive end device. During specific implementation, the CSI may further include, for example, but is not limited to, at least one of the following information: a channel quality indicator (CQI), a precoding matrix indicator (PMI), a CSI-RS resource indicator (CRI), and a rank indication (RI). When processing the to-be-transmitted signal, the transmit end device may directly process the to-be-transmitted signal by using the CSI fed back by the receive end device, or may adjust the CSI fed back by the receive end device, and process the to-be-transmitted signal by using adjusted CSI. For example, during specific implementation, the transmit end device may reduce the RI fed back by the receive end device, and process the to-be-transmitted signal by using a reduced RI. For another example, the transmit end device may further reconstruct a precoding matrix corresponding to the PMI fed back by the receive end device, and process the to-be-transmitted signal by using a reconstructed PMI, where the reconstruction process may be, for example, but is not limited to, performing orthogonalization processing on precoding matrices corresponding to PMIs fed back by a plurality of receive end devices scheduled simultaneously. A method for scheduling a plurality of receive end devices simultaneously to perform data transmission is also referred to as a multi-user multiple-input multiple-output (multi-user multiple-input multiple-output (MIMO), MU-MIMO) technology. For another example, the transmit end device may further reduce the CQI fed back by the receive end device, and process the to-be-transmitted signal by using a reduced CQI. It should be noted that, if the transmit end device adjusts the CSI fed back by the receive end device, the transmit end device may need to notify, the receive end device of the adjusted CSI, so that the receive end device restores the to-be-transmitted signal from a received signal based on the adjusted CSI. For example, if a base station adjusts the RI or the CQI, the base station needs to notify the receive end device of an adjusted RI or CQI. During specific implementation, a specific manner of adjusting, by the transmit end device, the CSI fed back by the receive end device is not limited in the embodiments of this application.

It should be understood that, the technical solutions of the embodiments of this application may be applied to various communications systems, such as a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system. Universal Mobile Telecommunications System (UMTS), a worldwide interoperability for microwave access (WiMAX) communications system, a future 5th generation (5G) system, or a new radio (NR) system.

It should be further understood that, the technical solutions of the embodiments of this application may be further applied to various communications systems based on a non-orthogonal multiple access technology, for example, a sparse code multiple access (SCMA) system. Certainly, SCMA may also be referred to as another name in the communications field. Further, the technical solutions of the embodiments of this application may be applied to a multi-carrier transmission system in which the non-orthogonal multiple access technology is used, for example, an orthogonal frequency division multiplexing (OFDM) system, a filter bank multi-carrier (FBMC) system, a generalized frequency division multiplexing (GFDM) system, or a filtered-orthogonal frequency division multiplexing (F-OFDM) system in which the non-orthogonal multiple access technology is used.

It should be further understood that, a terminal device in the embodiments of this application may communicate with one or more core networks by using a radio access network (RAN), and the terminal device may be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved public land mobile network (PLMN), or the like.

It should be further understood that, in the embodiments of this application, a network device may be configured to communicate with a terminal device. The network device may be a base transceiver station (BTS) in a GSM system or a CDMA system, may be a NodeB (NB) in a WCDMA system, or may be an evolved NodeB (eNB or eNodeB) in an LTE system. Alternatively, the network device may be a relay station, an access point, an in-vehicle device, a wearable device, a network-side device in a future 5G network, a network device in a future evolved PLMN, or the like.

The embodiments of this application may be applicable to an LTE system and a subsequent evolved system such as 5G, or other wireless communications systems in which various wireless access technologies are used, for example, a system in which an access technology such as code division multiple access, frequency division multiple access, time division multiple access, orthogonal frequency division multiple access, or single-carrier frequency division multiple access is used, and are particularly applicable to a scenario that requires channel information feedback and/or a scenario to which a secondary precoding technology is applied, for example, a wireless network to which a Massive MIMO technology is applied, or a wireless network to which a distributed antenna technology is applied.

It should be understood that, a multiple-input multiple-output (MIMO) technology is that a transmit end device and a receive end device respectively use a plurality of transmit antennas and receive antennas, so that a signal is transmitted and received by using the plurality of antennas of the transmit end device and the receive end device, thereby improving communication quality. The multiple-input multiple-output technology can fully use a space resource and implement multiple-input multiple-output by using the plurality of antennas, and can multiply a system channel capacity without an increase in spectrum resources and antenna transmit power.

MIMO may be divided into single-user multiple-input multiple-output (single-user MIMO, SU-MIMO) and multi-user multiple-input multiple-output (multi-user MIMO, MU-MIMO). In Massive MIMO, based on a multi-user beamforming principle, hundreds of antennas are arranged at a transmit end device, to modulate respective beams for dozens of target receivers, and dozens of signals are transmitted simultaneously on a same frequency resource by performing space signal isolation. Therefore, the Massive MIMO technology can fully use a spatial degree of freedom brought by a large-scale antenna configuration, to improve spectral efficiency.

FIG. 1 is a schematic diagram of a communications system used in an embodiment of this application. As shown in FIG. 1, the communications system 100 includes a network device 102, and the network device 102 may include a plurality of antenna groups. Each antenna group may include one or more antennas. For example, an antenna group may include antennas 104 and 106, another antenna group may include antennas 108 and 110, and an additional group may include antennas 112 and 114. For each antenna group, two antennas are shown in FIG. 1. However, more or fewer antennas may be used for each group. The network device 102 may additionally include a transmitter chain and a receiver chain. A person of ordinary skill in the art may understand that the transmitter chain and the receiver chain may both include a plurality of components related to signal sending and receiving, for example, a processor, a modulator, a multiplexer, a demodulator, a demultiplexer, or an antenna.

The network device 102 may communicate with a plurality of terminal devices. For example, the network device 102 may communicate with a terminal device 116 and a terminal device 122. However, it may be understood that the network device 102 may communicate with any quantity of terminal devices similar to the terminal device 116 or 122. The terminal devices 116 and 122 each may be, for example, a cellular phone, a smartphone, a portable computer, a handheld communications device, a handheld computing device, a satellite radio apparatus, a global positioning system, a PDA, and/or any other suitable device configured to perform communication in the wireless communications system 100.

As shown in FIG. 1, the terminal device 116 communicates with the antennas 112 and 114, where the antennas 112 and 114 send information to the terminal device 116 by using a forward link 118, and receive information from the terminal device 116 by using a backward link 120. Moreover, the terminal device 122 communicates with the antennas 104 and 106, where the antennas 104 and 106 send information to the terminal device 122 by using a forward link 124, and receive information from the terminal device 122 by using a backward link 126.

For example, in a frequency division duplex FDD system, the forward link 118 may use a frequency band different from that used by the backward link 120, and the forward link 124 may use a frequency band different from that used by the backward link 126.

For another example, in a time division duplex TDD system and a full duplex system, the forward link 118 and the backward link 120 may use a common frequency band, and the forward link 124 and the backward link 126 may use a common frequency band.

Each group of antennas and/or an area designed for communication is referred to as a sector of the network device 102. For example, an antenna group may be designed to communicate with a terminal device in a sector within a coverage area of the network device 102. When the network device 102 communicates with the terminal devices 116 and 122 by respectively using the forward links 118 and 124, transmit antennas of the network device 102 may improve signal-to-noise ratios of the forward links 118 and 124 by performing beamforming. In addition, compared with a manner in which the network device sends a signal to all terminal devices served by the network device by using a single antenna, when the network device 102 sends, by performing beamforming, a signal to the terminal devices 116 and 122 that are randomly distributed in a related coverage area, less interference is caused to a mobile device in a neighboring cell.

In a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain a particular quantity of data bits to be sent to a wireless communications receiving apparatus by using a channel. For example, the wireless communications sending apparatus may generate, receive from another communications apparatus, or store in a memory, the particular quantity of data bits to be sent to the wireless communications receiving apparatus by using the channel. Such data bits may be included in one or more transport blocks of data, and the transport block may be segmented to generate a plurality of code blocks.

Moreover, the communications system 100 may be a public land mobile network PLMN, a device to device (D2D) network, a machine to machine (M2M) network, or another network. FIG. 1 is only an example of a simplified schematic diagram for convenience of understanding, and the network may further include another network device that is not drawn in FIG. 1.

Figure 2:
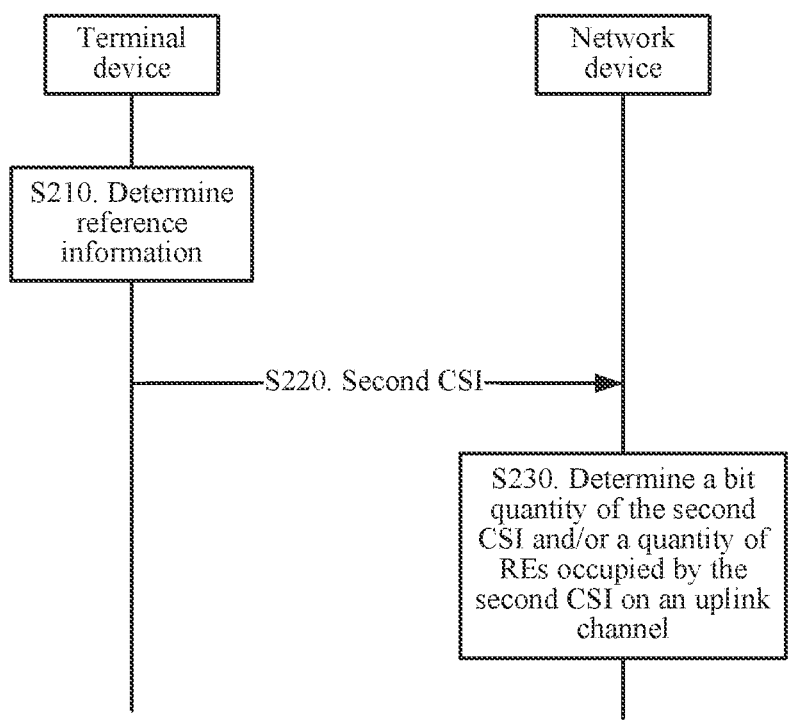
FIG. 2 is a schematic flowchart of a data transmission method according to an embodiment of this application.

FIG. 2 is a schematic flowchart of a data transmission method 200 according to an embodiment of this application. The method 200 may be applied to the communications system 100 shown in FIG. 1, but this embodiment of this application is not limited thereto.

S210. A terminal device determines reference information.

S220. The terminal device sends second channel state information (CSI) based on a comparison result of the reference information and a status parameter, where the second CSI includes all parameters in first CSI or includes some parameters in the first CSI, the first CSI is CSI that needs to be reported and that is configured by a network device for the terminal device, and the status parameter includes at least one of a transmission parameter of uplink data, a parameter in the first CSI, and a transmission parameter of the first CSI.

S230. The network device receives the second CSI sent by the terminal device, determines the status parameter based on an RI in the second CSI, and determines, based on the comparison result obtained by comparing the status parameter with the reference information, at least one of a bit quantity of the second CSI and a quantity of resource elements (Res) occupied by the second CSI on an uplink channel.

Specifically, the terminal device needs to report the first CSI based on a configuration of the network device. It should be understood that, the first CSI is CSI obtained by the terminal device by measuring a reference signal. However, actually, an uplink channel resource configured by the network device for the terminal device may be insufficient. Therefore, in this embodiment of this application, the terminal device may choose to actually report all or part of parameters in the first CSI. In other words, actually reported CSI is the second CSI, and the second CSI includes all or part of parameters in the first CSI. Whether all parameters in the first CSI or some parameters in the first CSI specifically need to be reported may be determined by the terminal device based on the reference information. In other words, the terminal device compares the status parameter with the reference information, and determines a parameter of the finally reported second CSI based on the obtained comparison result. It should be understood that, the first CSI and the second CSI are only for convenience of brief description. During actual implementation, CSI obtained by the terminal device through measurement is referred to as the first CSI, and CSI reported by the terminal device is referred to as the second CSI. When all of the CSI obtained through measurement needs to be reported, the second CSI is actually the first CSI.

It should be understood that, the reference information may be determined by the terminal device based on a predefined rule or may be determined by the terminal device based on the configuration of the network device. In other words, the reference information may be predefined, or may be configured by the network device for the terminal device by using signaling. This is not limited in this embodiment of this application.

The first CSI, namely, the CSI that needs to be reported and that is configured by the network device for the terminal device, is explained and described in detail below. It is assumed that communication bandwidth of the terminal device and the network device includes M subbands, where M is an integer greater than or equal to 1. Each of the M subbands includes a plurality of physical resource blocks (PRB), where each of the plurality of PRBs includes a plurality of resource elements (r RE). After measuring a reference signal such as a channel state information-reference signal (CSI-RS), the terminal device may obtain the first CSI. The first CSI may include an RI and a CQI, or the first CSI may include an RI, a CQI, and a PMI, and may further include another parameter. This is not limited in this embodiment of this application.

It should be understood that, when the terminal device reports the second CSI, the status parameter may include at least one of the parameter in the first CSI and the transmission parameter of the first CSI, or when the terminal device reports both the second CSI and the uplink data, the status parameter may further include the transmission parameter of the uplink data. This is not limited in this embodiment of this application.

In this specification, parameters in the first CSI are parameters included in the first CSI, for example, parameters such as an RI, a PMI, and a CQI, and transmission parameters of the first CSI are parameters used to indicate transmission situations of the first CSI, for example, a quantity of resource elements (REs) occupied by the first CSI on an uplink channel, a quantity of modulation symbols of the first CSI, an information bit quantity of the first CSI, and a bit quantity of the first CSI after channel coding is performed. Likewise, transmission parameters of the uplink data may be parameters used to indicate transmission situations of the uplink data, for example, a channel coding code rate of the uplink data, a quantity of REs occupied by the uplink data on the uplink channel, a quantity of modulation symbols of the uplink data, and a ratio of the quantity of REs occupied by the uplink data on the uplink channel to a total quantity of REs included in the uplink channel.

Therefore, the status parameter may be any one or more parameters in the foregoing example. When the status parameter includes one parameter, the reference information may be a threshold corresponding to the parameter or may be a plurality of thresholds corresponding to the parameter. When the status parameter includes a plurality of parameters, the reference information may be a threshold corresponding to each of the plurality of parameters. This is not limited in this embodiment of this application.

In this embodiment of this application, the terminal device may convert, based on the reference information, an existing parameter into a parameter that has a same property and that is indicated by the reference information, and then perform comparison, or may convert, based on the status parameter, a parameter indicated by the reference information into a parameter that has a same property as that of the status parameter, and then perform comparison. This is not limited in this embodiment of this application either. For example, the terminal device learns the RI in the first CSI, and the reference information is used to indicate a threshold of the quantity of REs occupied by the second CSI on the uplink channel. In an implementation, the terminal device may calculate, based on the RI in the first CSI, the quantity of REs occupied by the first CSI on the uplink channel, and then compare the quantity of REs occupied by the first CSI on the uplink channel, as the status parameter, with the threshold of the quantity of REs occupied by the second CSI on the uplink channel. In another implementation, the terminal device may calculate a threshold of the RI of the second CSI based on the threshold that is of the quantity of REs occupied by the second CSI on the uplink channel and that the reference information is used to indicate, and then compare the RI of the first CSI with the threshold of the RI.

The CSI fed back by the terminal device to the network device usually includes parameters such as a rank indication (RI), a precoding matrix indicator (PMI), and a channel quality indicator (CQI). An information bit quantity of the PMI and an information bit quantity of the CQI may change as the RI changes. Therefore, to ensure that both a maximum quantity of PMI bits and a maximum quantity of CQI bits can be carried in the uplink channel together with the uplink data, the network device may always allocate a resource based on a maximum CSI bit quantity. However, the CSI reporting triggered by the network device may be high-precision CSI reporting, and bit quantities of high-precision CSI may differ by one time with different RIs. If the network device always allocates an uplink channel resource based on a maximum CSI bit quantity, the uplink channel resource is wasted.

Usually, to avoid waste of the uplink channel resource, the network device may not allocate a resource based on a maximum CSI bit quantity corresponding to an RI, but estimates, based on prior information, an RI reported by the terminal device. In this case, an uplink channel resource allocated by the network device to the terminal device is unnecessarily capable of satisfying an uplink channel resource needed by the first CSI reported by the terminal device. Therefore, the terminal device needs to determine whether to discard some parameters in the first CSI. Likewise, the network device needs to learn whether the terminal device discards some parameters in the first CSI. In other words, the network device needs to determine whether the received second CSI includes all parameters in the first CSI or includes some parameters in the first CSI. In view of this, a piece of reference information, namely, the foregoing reference information, is introduced in this embodiment of this application. The terminal device may determine, based on the reference information, whether some parameters in the first CSI need to be discarded, and the network device may also perform determining based on the reference information, to learn a bit quantity of the actually reported second CSI or a quantity of REs occupied on the uplink channel, so that behavior of the terminal device is controllable and predictable, and a situation in which a CSI transmission failure occurs because understanding of the terminal device is inconsistent with that of the network device.

According to the data transmission method in this embodiment of this application, after determining, based on the reference information and the CSI that needs to be reported and that is configured by the network device for the terminal device, CSI that can be actually reported, the terminal device reports the CSI, so that the terminal device can properly use a limited uplink channel resource allocated by the network device to the terminal device, thereby improving transmission performance of the CSI.

Optionally, the first CSI may include an RI and a CQI. For the CQI in the first CSI, the CQI may be a broadband CQI, in other words, a value is calculated for a channel of the M subbands. Optionally, the CQI may be a CQI of each of the M subbands, where the CQI of the subband is calculated for a channel of the subband of the M subbands. Optionally, the CQI of the subband of the M subbands may be a differential value calculated relative to a broadband CQI, in other words, the CQI in the first CSI includes a broadband CQI and the CQI of the subband of the M subbands. This is not limited in this embodiment of this application.

Optionally, the first CSI includes an RI, a CQI, and a PMI. The PMI includes a broadband PMI and subband PMIs of the M subbands. Optionally, a CQI of each of the M subbands is calculated based on the RI, a first PMI, and a PMI on the subband. A PMI of each subband may be independently calculated, or PMIs of all subbands are dependently calculated. During independent calculation, the PMI of each subband may be calculated based on a channel sounding result of the subband, and is unrelated to channel sounding results of other subbands. During dependent calculation, optionally, PMIs of some subbands are obtained through joint processing such as an interpolation algorithm or a linear combination algorithm based on PMIs of other subbands. This is not limited in this embodiment of this application. Using the interpolation algorithm as an example, the terminal device assumes that PMIs on some subbands are obtained through the interpolation algorithm, to calculate CQIs on these subbands. An assumption based on which a PMI and/or a CQI of each subband is specifically calculated may be determined based on a predefined rule, based on an indication of the network device, or based on comparison between at least one of the transmission parameter of the uplink data, the parameter in the first CSI (for example, the RI), and the transmission parameter of the first CSI and the reference information according to the method of this application. This is not limited in this embodiment of this application.

In an optional embodiment, the reference information is used to indicate at least one of a threshold of the rank indication (RI) and a threshold of a transmission parameter of the second CSI, where the transmission parameter of the second CSI includes at least one of the following parameters: the quantity of resource elements (REs) occupied by the second CSI on the uplink channel, a quantity of modulation symbols of the second CSI, an information bit quantity of the second CSI, and a bit quantity of the second CSI after channel coding is performed.

Specifically, the reference information may indicate the threshold of the RI, may indicate a threshold of the quantity of REs occupied by the second CSI on the uplink channel, may indicate a threshold of the quantity of modulation symbols of the second CSI, may indicate a threshold of the information bit quantity of the second CSI (namely, a bit quantity of the second CSI before encoding), and may also indicate a threshold of the bit quantity of the second CSI after channel coding is performed.

It should be understood that, the foregoing indication may be a direct indication or may be an indirect indication (which is a corresponding threshold that can be derived by using a mapping relationship). This is not limited in this embodiment of this application. For example, for the direct indication, the reference information may directly be that the threshold of the RI is 2. For the indirect indication, the reference information may be a threshold identifier of the RI, and the terminal device may determine, based on the threshold identifier, that the threshold of the RI is 2. All these situations shall fall within the protection scope of the embodiments of this application.

In an optional embodiment, the reference information is used to indicate the threshold of the RI, and the status parameter is the RI in the first CSI; and if the RI in the first CSI is greater than the threshold of the RI, the second CSI includes some parameters in the first CSI, or if the RI in the first CSI is less than or equal to the threshold of the RI, the second CSI includes all parameters in the first CSI.

Specifically, the reference information may indicate the threshold of the RI, and the terminal device may compare the RI in the first CSI with the threshold of the RI. If the RI in the first CSI is greater than the threshold of the RI, the terminal device may determine that the uplink channel resource configured by the network device is insufficient to transmit the first CSI, and some parameters in the first CSI need to be discarded, in other words, the second CSI may include some parameters in the first CSI; or if the RI in the first CSI is less than or equal to the threshold of the RI, the terminal device may determine that the uplink channel resource configured by the network device is sufficient to transmit the first CSI, and the second CSI may include all parameters in the first CSI.

It should be understood that, because the second CSI includes all parameters or some parameters in the first CSI, the RI in the first CSI is the same as the RI in the second CSI in this embodiment of this application. It should be further understood that, if the RI in the first CSI is equal to the threshold of the RI, the second CSI may alternatively include some parameters in the first CSI. This is not limited in this embodiment of this application.

In an optional embodiment, the reference information is used to indicate a first threshold of the quantity of REs occupied by the second CSI on the uplink channel, and the status parameter is the quantity of REs occupied by the first CSI on the uplink channel; and if the quantity of REs occupied by the first CSI on the uplink channel is greater than the first threshold, the second CSI includes some parameters in the first CSI, or if the quantity of REs occupied by the first CSI on the uplink channel is less than or equal to the first threshold, the second CSI includes all parameters in the first CSI.

Specifically, the reference information may indicate the first threshold of the quantity of REs occupied by the second CSI on the uplink channel, and the terminal device may compare the quantity of REs occupied by the first CSI on the uplink channel with the first threshold. If the quantity of REs occupied by the first CSI on the uplink channel is greater than the first threshold, the terminal device may determine that the uplink channel resource configured by the network device is insufficient to transmit the first CSI, and some parameters in the first CSI need to be discarded, in other words, the second CSI may include some parameters in the first CSI; or if the quantity of REs occupied by the first CSI on the uplink channel is less than or equal to the first threshold, the terminal device may determine that the uplink channel resource configured by the network device is sufficient to transmit the first CSI, and the second CSI may include all parameters in the first CSI.

It should be understood that, in another implementation, if the quantity of REs occupied by the first CSI on the uplink channel is greater than or equal to the first threshold, it is determined that some parameters in the first CSI need to be discarded, or if the quantity of REs occupied by the first CSI on the uplink channel is less than the first threshold, the second CSI includes all parameters in the first CSI. Subsequent embodiments are similar, and details are not described again.

It should be understood that, the terminal device may directly determine the quantity of REs occupied by the first CSI on the uplink channel, or may calculate, based on the RI in the first CSI, the quantity of REs occupied by the first CSI on the uplink channel. It should be further understood that, if the quantity of REs occupied by the first CSI on the uplink channel is equal to the first threshold, the second CSI may alternatively include some parameters in the first CSI. This is not limited in this embodiment of this application.

In an optional embodiment, the reference information is used to indicate a second threshold of the quantity of modulation symbols of the second CSI, and the status parameter is the quantity of modulation symbols of the first CSI; and if the quantity of modulation symbols of the first CSI is greater than the second threshold, the second CSI includes some parameters in the first CSI, or if the quantity of modulation symbols of the first CSI is less than or equal to the second threshold, the second CSI includes all parameters in the first CSI.

Specifically, the reference information may indicate the second threshold of the quantity of modulation symbols of the second CSI, and the terminal device may compare the quantity of modulation symbols of the first CSI with the second threshold. If the quantity of modulation symbols of the first CSI is greater than the second threshold, the terminal device may determine that the uplink channel resource configured by the network device is insufficient to transmit the first CSI, and some parameters in the first CSI need to be discarded, in other words, the second CSI may include some parameters in the first CSI; or if the quantity of modulation symbols of the first CSI is less than or equal to the second threshold, the terminal device may determine that the uplink channel resource configured by the network device is sufficient to transmit the first CSI, and the second CSI may include all parameters in the first CST.

It should be understood that, the terminal device may directly determine the quantity of modulation symbols of the first CSI, or may calculate, based on the RI in the first CSI, the quantity of modulation symbols of the first CSI. It should be further understood that, if the quantity of modulation symbols of the first CSI is equal to the second threshold, the second CSI may alternatively include some parameters in the first CSI. This is not limited in this embodiment of this application.

In an optional embodiment, the reference information is used to indicate a third threshold of the information bit quantity of the second CSI, and the status parameter is the information bit quantity of the first CSI; and if the information bit quantity of the first CSI is greater than the third threshold, the second CSI includes some parameters in the first CSI, or if the information bit quantity of the first CSI is less than or equal to the third threshold, the second CSI includes all parameters in the first CSI.

Specifically, the reference information may indicate the third threshold of the information bit quantity of the second CSI, and the terminal device may compare the information bit quantity of the first CSI with the third threshold. If the information bit quantity of the first CSI is greater than the third threshold, the terminal device may determine that the uplink channel resource configured by the network device is insufficient to transmit the first CSI, and some parameters in the first CSI need to be discarded, in other words, the second CSI may include some parameters in the first CSI; or if the information bit quantity of the first CSI is less than or equal to the third threshold, the terminal device may determine that the uplink channel resource configured by the network device is sufficient to transmit the first CSI, and the second CSI may include all parameters in the first CSI.

It should be understood that, the information bit quantity of the first CSI is a bit quantity of the first CSI before channel coding is performed. The terminal device may directly determine the information bit quantity of the first CSI, or may calculate, based on the RI in the first CSI, the information bit quantity of the first CSI. It should be further understood that, if the information bit quantity of the first CSI is equal to the third threshold, the second CSI may alternatively include some parameters in the first CSI. This is not limited in this embodiment of this application.

In an optional embodiment, the reference information is used to indicate a fourth threshold of the bit quantity of the second CSI after channel coding is performed, and the status parameter is the bit quantity of the first CSI after channel coding is performed; and if the bit quantity of the first CSI after channel coding is performed is greater than the fourth threshold, the second CSI includes some parameters in the first CSI, or if the bit quantity of the first CSI after channel coding is performed is less than or equal to the fourth threshold, the second CSI includes all parameters in the first CSI.

Specifically, the reference information may indicate the fourth threshold of the bit quantity of the second CSI after channel coding is performed, and the terminal device may compare the bit quantity of the first CSI after channel coding is performed with the fourth threshold. If the bit quantity of the first CSI after channel coding is performed is greater than the fourth threshold, the terminal device may determine that the uplink channel resource configured by the network device is insufficient to transmit the first CSI, and some parameters in the first CSI need to be discarded, in other words, the second CSI may include some parameters in the first CSI; or if the bit quantity of the first CSI after channel coding is performed is less than or equal to the fourth threshold, the terminal device may determine that the uplink channel resource configured by the network device is sufficient to transmit the first CSI, and the second CSI may include all parameters in the first CSI.

It should be understood that, the terminal device may directly determine the bit quantity of the first CSI after channel coding is performed, or may calculate, based on the RI in the first CSI, the bit quantity of the first CSI after channel coding is performed. It should be further understood that, if the bit quantity of the first CSI after channel coding is performed is equal to the fourth threshold, the second CSI may alternatively include some parameters in the first CSI. This is not limited in this embodiment of this application.

In an optional embodiment, the sending, by the terminal device, second CSI includes: sending, by the terminal device, the second CSI and the uplink data, where the uplink data and the second CSI are carried on a same uplink channel.

Correspondingly, the network device receives the second CSI and the uplink data.

Specifically, the terminal device may add the second CSI to the uplink channel together with the uplink data and send the second CSI and the uplink data to the network device. In this case, the uplink channel resource allocated by the network device is shared by the second CSI and the uplink data.

In a possible implementation, the terminal device receives resource allocation information of the uplink channel, and MCS information of a modulation and coding scheme (MCS) code word of the uplink data by using first signaling. When one code word is transmitted in the uplink data, the first signaling includes an MCS of one code word, or when two code words are transmitted in the uplink data, the first signaling includes an MCS of two code words. The uplink channel is used to carry the second CSI and the uplink data. Optionally, the first signaling may be DCI signaling. The terminal device receives a parameter β by using second signaling, and the parameter P is used to determine a channel coding parameter of all or part of parameters of CSI carried on the uplink channel. For example, the parameter β may be used to determine a channel coding parameter of a PMI, and may be used to determine a channel coding parameter of a CQI. Optionally, in the second signaling, same β or different β may be set for an RI, a PMI, and a CQI. Optionally, the second signaling may be RRC signaling.

The terminal device may obtain information bits of the first CSI by measuring a reference signal, and obtain information bits of the uplink data from to-be-sent data. Based on the configuration of the network device, the first CSI may include an RI, a PMI, and a CQI, may include only an RI and a PMI, or may include only an RI and a CQI. This is not limited in this embodiment of this application. Only one PMI and one CQI may be fed back for entire bandwidth, or a PMI and/or a CQI of each subband may be fed back for the subband in entire bandwidth. The terminal device determines, based on the first signaling and the second signaling, information about a first resource occupied by all or part of parameters in the first CSI on the uplink channel, and/or a channel coding parameter of all or part of parameters in the first CSI, for example, a channel coding code rate of the first CSI.

The terminal device may determine, in a plurality of manners, the information about the first resource occupied by all or part of parameters in the first CSI on the uplink channel. Optionally, the terminal device may determine, based on a ratio of an information bit quantity (which may include a CRC check bit) of each parameter in the first CSI to an information bit quantity (which may include a CRC check bit) of to-be-sent data, values of the corresponding parameter, and resource allocation information included in the first signaling, a quantity of resource elements (REs) occupied by the parameter, in other words, determine information about a first resource occupied by the parameter. Optionally, if the terminal device performs joint channel coding on a plurality of parameters in the first CSI, the terminal device may determine, based on a ratio of a total information bit quantity (which may include a CRC check bit) of the plurality of parameters to an information bit quantity (which may include a CRC check bit) of to-be-sent data, values of the corresponding parameters, and resource allocation information included in the first signaling, a quantity of REs jointly occupied by the plurality of parameters, in other words, determine information about a first resource occupied by the plurality of parameters. This is not limited in this embodiment of this application. Then, the terminal device may determine, based on the information about the first resource and the resource allocation information, information about a second resource occupied by the uplink data on the uplink channel. The terminal device may determine a channel coding parameter of the uplink data such as a channel coding code rate of the uplink data based on the information about the second resource and the MCS information.

The terminal device may determine, based on all or part of information of the information about the first resource, the information about the second resource, the channel coding parameter of the first CSI, and the channel coding parameter of the uplink data and based on the reference information, information actually carried on the uplink channel. For example, the terminal device may determine to add all or part of the first CSI to the uplink channel but not to add the uplink data, the terminal device determines to add all CSI and the uplink data to the uplink channel, or the terminal device determines to add part of the first CSI and the uplink data to the uplink channel. This is not limited in this embodiment of this application.

The terminal device again determines, based on a parameter in the second CSI that can be actually sent, a time-frequency resource occupied by the second CSI, and a channel coding parameter. The terminal device performs channel coding on the parameter in the second CSI, to obtain bits after CSI encoding. Then, the terminal device modulates the bits after CSI encoding, to obtain a CSI modulation symbol. Finally, the terminal device maps the CSI modulation symbol to a CSI time-frequency resource based on the determined time-frequency resource. If the terminal device also sends the uplink data, the terminal device again determines, based on the CSI time-frequency resource, the channel coding code rate of the uplink data and a time-frequency resource occupied by the uplink data, and performs channel coding on to-be-sent uplink data, to obtain bits after data encoding. Then, the terminal device modulates the bits after data encoding, to obtain a data modulation symbol. Finally, the terminal device modulates the data on a corresponding time-frequency resource. The terminal device sends the second CSI or sends the second CSI and the uplink data on the uplink channel.

In an optional embodiment, the transmission parameter of the second CSI further includes: a ratio of the quantity of REs occupied by the second CSI on the uplink channel to a total quantity of REs included in the uplink channel.

In an optional embodiment, the reference information is used to indicate a fifth threshold of the ratio of the quantity of REs occupied by the second CSI on the uplink channel to the total quantity of REs included in the uplink channel, and the status parameter is a ratio of the quantity of REs occupied by the first CSI on the uplink channel to the total quantity of REs included in the uplink channel; and if the ratio of the quantity of REs occupied by the first CSI on the uplink channel to the total quantity of REs included in the uplink channel is greater than the fifth threshold, the second CSI includes some parameters in the first CSI, or if the ratio of the quantity of REs occupied by the first CSI on the uplink channel to the total quantity of REs included in the uplink channel is less than or equal to the fifth threshold, the second CSI includes all parameters in the first CSI.

Specifically, the reference information may indicate the fifth threshold of the ratio of the quantity of REs occupied by the second CSI on the uplink channel to the total quantity of REs included in the uplink channel, and the terminal device may compare the ratio of the quantity of REs occupied by the first CSI on the uplink channel to the total quantity of REs included in the uplink channel with the fifth threshold. If the ratio of the quantity of REs occupied by the first CSI on the uplink channel to the total quantity of REs included in the uplink channel is greater than the fifth threshold, the terminal device may determine that the uplink channel resource configured by the network device is insufficient to transmit the first CSI, and some parameters in the first CSI need to be discarded, in other words, the second CSI may include some parameters in the first CSI; or if the ratio of the quantity of REs occupied by the first CSI on the uplink channel to the total quantity of REs included in the uplink channel is less than or equal to the fifth threshold, the terminal device may determine that the uplink channel resource configured by the network device is sufficient to transmit the first CSI, and the second CSI may include all parameters in the first CSI.

It should be understood that, resource elements of the uplink channel may be collectively referred to as a resource element set, and the ratio of the quantity of REs occupied by the first CSI on the uplink channel to the total quantity of REs included in the uplink channel may also be referred to as a ratio of a quantity of REs of the first CSI in a resource element set to a total quantity of REs in the resource element set. This is not limited in this embodiment of this application. The terminal device may directly determine the ratio of the quantity of REs occupied by the first CSI on the uplink channel to the total quantity of REs included in the uplink channel, or may calculate, based on the RI in the first CSI, the ratio of the quantity of REs occupied by the first CSI on the uplink channel to the total quantity of REs included in the uplink channel. It should be further understood that, if the ratio of the quantity of REs occupied by the first CSI on the uplink channel to the total quantity of REs included in the uplink channel is equal to the fifth threshold, the second CSI may alternatively include some parameters in the first CSI. This is not limited in this embodiment of this application.

In an optional embodiment, the reference information is used to indicate a threshold of the transmission parameter of the uplink data; and the transmission parameter of the uplink data includes at least one of the following parameters: a channel coding code rate of the uplink data, a quantity of REs occupied by the uplink data on the uplink channel, a quantity of modulation symbols of the uplink data, and a ratio of the quantity of REs occupied by the uplink data on the uplink channel to a total quantity of REs included in the uplink channel.

Specifically, when the network device schedules the terminal device to send both the second CSI and the uplink data, the reference information may indicate the channel coding code rate of the uplink data, may indicate the quantity of REs occupied by the uplink data on the uplink channel, may indicate the quantity of modulation symbols of the uplink data, or may indicate the ratio of the quantity of REs occupied by the uplink data on the uplink channel to the total quantity of REs included in the uplink channel. This is not limited in this embodiment of this application.

It should be understood that, the foregoing indication may be a direct indication or may be an indirect indication (which is a corresponding threshold that can be derived by using a mapping relationship). This is not limited in this embodiment of this application.

In an optional embodiment, the reference information is used to indicate a sixth threshold of the channel coding code rate of the uplink data, and the status parameter is the channel coding code rate of the uplink data; and if the channel coding code rate of the uplink data is greater than the sixth threshold, the second CSI includes some parameters in the first CSI, or if the channel coding code rate of the uplink data is less than or equal to the sixth threshold, the second CSI includes all parameters in the first CSI.

Specifically, the reference information may indicate the sixth threshold of the channel coding code rate of the uplink data, and the terminal device may compare the channel coding code rate of the uplink data with the sixth threshold. If the channel coding code rate of the uplink data is greater than the sixth threshold, the terminal device may determine that the uplink channel resource configured by the network device is insufficient to transmit the first CSI, and some parameters in the first CSI need to be discarded, in other words, the second CSI may include some parameters in the first CSI; or if the channel coding code rate of the uplink data is less than or equal to the sixth threshold, the terminal device may determine that the uplink channel resource configured by the network device is sufficient to transmit the first CSI, and the second CSI may include all parameters in the first CSI.

It should be understood that, the terminal device may calculate the channel coding code rate of the uplink data based on resource allocation information and the parameters in the first CSI. It should be further understood that, if the channel coding code rate of the uplink data is equal to the sixth threshold, the second CSI may alternatively include some parameters in the first CSI. This is not limited in this embodiment of this application.

In an optional embodiment, the reference information is used to indicate a seventh threshold of the quantity of REs occupied by the uplink data on the uplink channel, and the status parameter is the quantity of REs occupied by the uplink data on the uplink channel; and if the quantity of REs occupied by the uplink data on the uplink channel is less than the seventh threshold, the second CSI includes some parameters in the first CSI, or if the quantity of REs occupied by the uplink data on the uplink channel is greater than or equal to the seventh threshold, the second CSI includes all parameters in the first CSI.

Specifically, the reference information may indicate the seventh threshold of the quantity of REs occupied by the uplink data on the uplink channel, and the terminal device may compare the quantity of REs occupied by the uplink data on the uplink channel with the seventh threshold. If the quantity of REs occupied by the uplink data on the uplink channel is greater than the seventh threshold, the terminal device may determine that the uplink channel resource configured by the network device is insufficient to transmit the first CSI, and some parameters in the first CSI need to be discarded, in other words, the second CSI may include some parameters in the first CSI; or if the quantity of REs occupied by the uplink data on the uplink channel is less than or equal to the seventh threshold, the terminal device may determine that the uplink channel resource configured by the network device is sufficient to transmit the first CSI, and the second CSI may include all parameters in the first CSI.

It should be understood that, the terminal device may calculate, based on the resource allocation information and the parameters in the first CSI, the quantity of REs occupied by the uplink data on the uplink channel. It should be further understood that, if the quantity of REs occupied by the uplink data on the uplink channel is equal to the seventh threshold, the second CSI may alternatively include some parameters in the first CSI. This is not limited in this embodiment of this application.

In an optional embodiment, the reference information is used to indicate an eighth threshold of the quantity of modulation symbols of the uplink data, and the status parameter is the quantity of modulation symbols of the uplink data and if the quantity of modulation symbols of the uplink data is less than the eighth threshold, the second CSI includes some parameters in the first CSI, or if the quantity of modulation symbols of the uplink data is greater than or equal to the eighth threshold, the second CSI includes all parameters in the first CSI.

Specifically, the reference information may indicate the eighth threshold of the quantity of modulation symbols of the uplink data, and the terminal device may compare the quantity of modulation symbols of the uplink data with the eighth threshold. If the quantity of modulation symbols of the uplink data is greater than the eighth threshold, the terminal device may determine that the uplink channel resource configured by the network device is insufficient to transmit the first CSI, and some parameters in the first CSI need to be discarded, in other words, the second CSI may include some parameters in the first CST; or if the quantity of modulation symbols of the uplink data is less than or equal to the eighth threshold, the terminal device may determine that the uplink channel resource configured by the network device is sufficient to transmit the first CSI, and the second CSI may include all parameters in the first CSI.

It should be understood that, the terminal device may calculate the quantity of modulation symbols of the uplink data based on the resource allocation information and the parameters in the first CSI. It should be further understood that, if the quantity of modulation symbols of the uplink data is equal to the eighth threshold, the second CSI may alternatively include some parameters in the first CSI. This is not limited in this embodiment of this application.

In an optional embodiment, the reference information is used to indicate a ninth threshold of the ratio of the quantity of REs occupied by the uplink data on the uplink channel to the total quantity of REs included in the uplink channel, and the status parameter is the ratio of the quantity of REs occupied by the uplink data on the uplink channel to the total quantity of REs included in the uplink channel; and if the ratio of the quantity of REs occupied by the uplink data on the uplink channel to the total quantity of REs included in the uplink channel is less than the ninth threshold, the second CSI includes some parameters in the first CSI, or if the ratio of the quantity of REs occupied by the uplink data on the uplink channel to the total quantity of REs included in the uplink channel is greater than or equal to the ninth threshold, the second CSI includes all parameters in the first CSI.

Specifically, the reference information may indicate the ninth threshold of the ratio of the quantity of REs occupied by the uplink data on the uplink channel to the total quantity of REs included in the uplink channel, and the terminal device may compare the ratio of the quantity of REs occupied by the uplink data on the uplink channel to the total quantity of REs included in the uplink channel with the ninth threshold. If the ratio of the quantity of REs occupied by the uplink data on the uplink channel to the total quantity of REs included in the uplink channel is greater than the ninth threshold, the terminal device may determine that the uplink channel resource configured by the network device is insufficient to transmit the first CSI, and some parameters in the first CSI need to be discarded, in other words, the second CSI may include some parameters in the first CSI; or if the ratio of the quantity of REs occupied by the uplink data on the uplink channel to the total quantity of REs included in the uplink channel is less than or equal to the ninth threshold, the terminal device may determine that the uplink channel resource configured by the network device is sufficient to transmit the first CSI, and the second CSI may include all parameters in the first CSI.

It should be understood that, the terminal device may calculate, based on the resource allocation information and the parameters in the first CSI, the ratio of the quantity of REs occupied by the uplink data on the uplink channel to the total quantity of REs included in the uplink channel. It should be further understood that, if the ratio of the quantity of REs occupied by the uplink data on the uplink channel to the total quantity of REs included in the uplink channel is equal to the ninth threshold, the second CSI may alternatively include some parameters in the first CSI. This is not limited in this embodiment of this application.

It should be further understood that, the reference information may indicate one or more thresholds. If the reference information indicates a plurality of thresholds, there may be the following two situations:

1. The reference information indicates a threshold of each of a plurality of status parameters.

Specifically, the reference information may indicate more than one of the following thresholds: the threshold of the RI, the first threshold of the quantity of resource elements (REs) occupied by the second CSI on the uplink channel, the second threshold of the quantity of modulation symbols of the second CSI, the third threshold of the information bit quantity of the second CSI, the fourth threshold of the bit quantity of the second CSI after channel coding is performed, the fifth threshold of the ratio of the quantity of REs occupied by the second CSI on the uplink channel to the total quantity of REs included in the uplink channel, the sixth threshold of the channel coding code rate of the uplink data, the seventh threshold of the quantity of REs occupied by the uplink data on the uplink channel, the eighth threshold of the quantity of modulation symbols of the uplink data, and the ninth threshold of the ratio of the quantity of REs occupied by the uplink data on the uplink channel to the total quantity of REs included in the uplink channel. The terminal device may determine to report all parameters of the first CSI when the status parameter of the first CSI satisfies a determining condition of any one of a plurality of thresholds indicated by the reference information, or may determine to report all parameters of the first CSI when the status parameter of the first CSI satisfies determining conditions of all thresholds indicated by the reference information; otherwise, the terminal device reports some parameters in the first CSI. This is not limited in this embodiment of this application.

2. The reference information indicates a plurality of thresholds of a status parameter.

Specifically, the reference information may indicate a plurality of thresholds such as two thresholds for a status parameter.

Using an example in which the status parameter is the channel coding code rate of the uplink data, the reference information indicates thresholds r1 and r2 of the channel coding code rate of the uplink data. When the channel coding code rate of the uplink data is greater than r1 but is less than r2, the terminal device may report some parameters in the first CSI and all of the uplink data; when the channel coding code rate of the uplink data is greater than r2, the terminal device may report all or part of parameters in the first CSI, but does not report the uplink data, where if the terminal device determines that the uplink channel may carry all of the first CSI, the terminal device reports all parameters in the first CSI, or if the terminal device determines that the uplink channel is insufficient to carry all of the first CSI, the terminal device reports some parameters in the first CSI; or when the channel coding code rate of the uplink data is less than r1, the terminal device may report all parameters in the first CSI and the uplink data.

Using an example in which the status parameter is the ratio of the quantity of REs occupied by the uplink data on the uplink channel to the total quantity of REs included in the uplink channel, the reference information indicates thresholds p1 and p2 of the ratio of the quantity of REs occupied by the uplink data on the uplink channel to the total quantity of REs included in the uplink channel. When the ratio of the quantity of REs occupied by the uplink data on the uplink channel to the total quantity of REs included in the uplink channel is less than p1 but is greater than p2, the terminal device may report some parameters in the first CSI and all of the uplink data; when the ratio of the quantity of REs occupied by the uplink data on the uplink channel to the total quantity of REs included in the uplink channel is less than p2 but is greater than 0, the terminal device reports all parameters in the first CSI but does not report the uplink data; otherwise, the uplink channel is insufficient to carry all of the CSI, and the terminal device reports some parameters in the first CSI; or when the ratio of the quantity of REs occupied by the uplink data on the uplink channel to the total quantity of REs included in the uplink channel is greater than p1, the terminal device reports all parameters of the first CSI and the uplink data.

It should be understood that, in this embodiment of this application, because the first CSI needs to be transmitted on the uplink channel together with the uplink data, a sum of the quantity of REs occupied by the first CSI on the uplink channel and the quantity of REs occupied by the uplink data on the uplink channel should be equal to the total quantity of REs included in the uplink channel. For example, the total quantity of REs included in the uplink channel is 100. In this case, if the threshold p2 is equal to ½, and a quantity of REs that the CSI needs to occupy is 75, a ratio is 75/100=3/4, which is less than p2 and is greater than 0. In this case, the terminal device reports all parameters in the first CSI, but does not report the uplink data. If a quantity of REs that the first CSI needs to occupy is 125, the total quantity of REs included in the uplink channel are insufficient to transmit the CSI, and moreover there is no RE that may send the uplink data. Therefore, the terminal device reports only some parameters in the first CSI.

Using an example in which the status parameter is the ratio of the quantity of REs occupied by the first CSI on the uplink channel to the total quantity of REs included in the uplink channel, the reference information indicates thresholds q1 and q2 of the ratio of the quantity of REs occupied by the second CSI on the uplink channel to the total quantity of REs included in the uplink channel. When the ratio of the quantity of REs occupied by the first CSI on the uplink channel to the total quantity of REs included in the uplink channel is greater than q1 but is less than q2, the terminal device reports some parameters in the first CSI and all of the uplink data according to the foregoing rule; when the ratio of the quantity of REs occupied by the first CSI on the uplink channel to the total quantity of REs included in the uplink channel is greater than q2 but is less than 1, the terminal device reports all parameters in the first CSI but does not report the uplink data; when the ratio of the quantity of REs occupied by the first CSI on the uplink channel to the total quantity of REs included in the uplink channel is greater than 1, the terminal device reports some parameters in the first CSI; or when the ratio of the quantity of REs occupied by the first CSI on the uplink channel to the total quantity of REs included in the uplink channel is less than q1, the terminal device reports all parameters in the first CSI and the uplink data.

It should be understood that, the foregoing description is only a description example, and a situation in which the status parameter is another parameter and has two thresholds is similar to the foregoing situations. Details are not described herein again.

In this embodiment of this application, if the terminal device determines the second CSI by comparing the parameter in the first CSI with the reference information, for example, the parameter in the first CSI is the RI and the reference information is the threshold of the RI, the terminal device reports PMIs of some subbands, CQIs of all subbands, and the RI when the RI exceeds the threshold of the RI. Optionally, in this case, in the CQIs of all of the subbands, a subband PMI that is not reported is calculated according to the foregoing interpolation method with reference to an obtained subband PMI. When the RI does not exceed the threshold of the RI, the terminal device reports PMIs of all of the subbands, the CQIs of all of the subbands, and the RI. Optionally, in this case, when the terminal device calculates the CQIs of all of the subbands, the terminal device assumes that the PMIs of these subbands are calculated independently according to the foregoing interpolation method, and unless a default rule is used, CQIs of some subbands are calculated based on a PMI determined according to the interpolation method.

Likewise, if the terminal device determines the second CSI by comparing the transmission parameter of the uplink data with the reference information, for example, the transmission parameter of the uplink data is the channel coding code rate of the uplink data and the reference information is the threshold of the channel coding code rate of the uplink data, the terminal device reports PMIs of some subbands, CQIs of all subbands, and the RI when the channel coding code rate of the uplink data exceeds the threshold of the channel coding code rate of the uplink data. Optionally, in this case, in the CQIs of all of the subbands, a subband PMI that is not reported is calculated according to the foregoing interpolation method with reference to an obtained subband PMI. When the channel coding code rate of the uplink data does not exceed the threshold of the channel coding code rate of the uplink data, the terminal device reports PMIs of all of the subbands, the CQIs of all of the subbands, and the RI. Optionally, in this case, when the terminal device calculates the CQIs of all of the subbands, the terminal device assumes that the PMIs of these subbands are calculated independently according to the foregoing interpolation method, and unless a default rule is used, CQIs of some subbands are calculated based on a PMI determined according to the interpolation method.

A situation in which the reference information is another parameter such as the quantity of resource elements (REs) occupied by the second CSI on the uplink channel, the quantity of modulation symbols of the second CSI, the information bit quantity of the second CSI, the bit quantity of the second CSI after channel coding is performed, the quantity of REs occupied by the uplink data on the uplink channel, the quantity of modulation symbols of the uplink data, and the ratio of the quantity of REs occupied by the uplink data on the uplink channel to the total quantity of REs included in the uplink channel is similar to the foregoing situations. Details are not described herein again.

In an optional embodiment, before the sending, by the terminal device, second CSI, the method further includes, determining, by the terminal device based on the comparison result and priority information, whether to send the uplink data, where the priority information is used to indicate priorities of the second CSI and the uplink data; and the sending, by the terminal device, second CSI includes: sending, by the terminal device, the second CSI and the uplink data if the terminal device determines to send the uplink data.

Specifically, the terminal device may first determine priorities of CSI and the uplink data based on the priority information, and then determine whether the uplink data needs to be sent, in other words, determine, based on the priority information, to preferably discard some information in the first CSI or preferably discard the uplink data. The following two situations are specifically used as an example for description.

The reference information is the quantity of REs occupied by the first CSI on the uplink channel. If a CSI priority is higher, when the quantity of REs occupied by the first CSI on the uplink channel exceeds the first threshold, but is less than a quantity of REs included in a time-frequency resource of the uplink channel allocated in the first signaling (for example, DCI), the terminal device reports the second CSI but does not report the uplink data, and the second CSI may include all parameters in the first CSI; or when the quantity of REs occupied by the first CSI on the uplink channel exceeds a quantity of REs included in a time-frequency resource of the uplink channel, the terminal device reports the second CSI, and the second CSI is a proper subset of the first CSI. If a priority of the uplink data is higher, when the quantity of REs occupied by the first CSI exceeds the first threshold, the terminal device reports the second CSI and the uplink data, and the second CSI includes some parameters in the first CSI.

The reference information is the ratio of the quantity of REs occupied by the uplink data on the uplink channel to the total quantity of REs included in the uplink channel. If the CSI priority is higher, when the ratio of the quantity of REs occupied by the uplink data on the uplink channel to the total quantity of REs included in the uplink channel is greater than the ninth threshold but is greater than 0, the terminal device reports the second CSI but does not report the uplink data, and the second CSI includes the first CSI; or when the ratio of the quantity of REs occupied by the uplink data on the uplink channel to the total quantity of REs included in the uplink channel is less than 0, the terminal device reports the second CSI, and the second CSI includes some parameters in the first CSI. If the priority of the uplink data is higher, when the ratio of the quantity of REs occupied by the uplink data on the uplink channel to the total quantity of REs included in the uplink channel is less than the ninth threshold, the terminal device reports the second CSI and the uplink data, and the second CSI includes some parameters in the first CSI.

It should be understood that, the priority information may be predefined, or may be configured by the network device for the terminal device by using signaling. This is not limited in this embodiment of this application.

In an optional embodiment, the parameter in the first CSI includes: second frequency domain granularity parameters of M subbands and a first frequency domain granularity parameter, where the first frequency domain granularity parameter includes an RI, and the second frequency domain granularity parameters of the M subbands include a channel quality indicator (CQI) of each of the M subbands and/or a precoding matrix indicator (PMI) of the subband; and the parameter in the second CSI includes any one of the following: second frequency domain granularity parameters of N subbands and the first frequency domain granularity parameter; all or part of second frequency domain granularity parameters of each of the M subbands and the first frequency domain granularity parameter; and the first frequency domain granularity parameter, the CQI of each of the M subbands, and a PMI of each of the N subbands, where the M subbands include the N subbands, both M and N are integers greater than or equal to 1, and M is greater than N.

It should be understood that, the first frequency domain granularity parameter is also referred to as a broadband parameter and has a same value on the M subbands, and the second frequency domain granularity parameter is also referred to as a subband parameter and has a different value for each of the M subbands. Specifically, if the second CSI reported by the terminal device includes some parameters in the first CSI, the terminal device may select some parameters in the first CSI based on a predefined rule to perform reporting. For example, the terminal device may report only a proportion of parameters (for example, an RI, a broadband PMI, all subband CQIs, and a proportion of subband PMIs; an RI, a broadband PMI, and a proportion of subband PMIs and subband CQIs; an RI, a broadband PMI, a broadband CQI, a subband PMI and/or a subband CQI of the M subbands whose indices are the highest; or an RI, and PMIs and/or CQIs corresponding to some DFT vectors) in the first CSI based on a default rule.

Optionally, the terminal device may determine a proportion, the terminal device reports a proportion of CSI parameters and the uplink data, and the proportion may ensure that the data and the second CSI can be carried on the uplink channel. For example, if a predefined proportion is ½, the terminal device may report the RI, CQIs of all of the M subbands, the broadband PMI, and subband PMIs of M/2 subbands. In Type II codebook design (namely, high-precision CSI reporting) of new radio (NR), an information bit quantity of a PMI corresponding to RI=2 is approximately equal to twofold an information bit quantity of a PMI corresponding to RI=1. Therefore, when the network device assumes that the terminal device is to report CSI corresponding to RI=1 and allocate a time-frequency resource of the uplink channel based on RI=1, the terminal device reports some parameters in the first CSI based on a proportion of ½, to ensure that the resource of the uplink channel allocated by the network device to the terminal device is sufficient to carry the second CSI (namely, some parameters in the first CSI).

Optionally, the terminal device may determine n proportions $x_i$, where $0 \leq x_i \leq 1$, $i=1, \ldots, n$, n is an integer greater than 1, and $x_i$ indicates that the terminal device may discard subband parameters (for example, a subband CQI and/or a subband PMI) of $M \times x_i$ subbands based on the proportions $x_i$, or the terminal device may report a broadband parameter and subband parameters (for example, a subband CQI and/or a subband PMI) of $M \times x_i$ subbands based on the proportions $x_i$. During specific implementation, when a threshold indicated by the reference information is satisfied, the terminal device may discard as few as possible parameters, in other words, report as many as possible parameters. It is assumed that there are three proportions: $x_1$, $x_2$, and $x_3$, the reference information is the threshold of the RI, an upper bound of a CSI bit quantity corresponding to the threshold of the RI is A, and a bit quantity corresponding to the first CSI is B. Using the case in which the terminal device may discard the subband parameters of the $M \times x_i$ subbands based on the proportions $x_i$ as an example, the terminal device may select a minimum $x_i$ from the foregoing three proportions, so that $B \times (1-x_i) < A$. In other words, subband parameters of $M \times x_i$ subbands are discarded, and remaining parameters in the first CSI that are used as the second CSI are carried on the uplink channel and sent. Using the case in which the terminal device may report the broadband parameter and the subband parameters of the $M \times x_i$ subbands based on the proportions $x_i$ as an example, the terminal device may select a maximum $x_i$ from the foregoing three proportions, so that $B \times x_i < A$. In other words, subband parameters of $M \times x_i$ subbands are reported.

It should be understood that, the foregoing proportions may be predefined, or may be configured by the network device for the terminal device by using signaling. This is not limited in this embodiment of this application. In this way, when determining that the second CSI reported by the terminal device is some parameters in the first CSI, the network device may directly determine, based on the foregoing proportions, subbands whose parameters are discarded by the terminal device, and subbands whose parameters are reported by the terminal device.

In an optional embodiment, the reference information is predefined; or the method further includes: sending, by the network device, the reference information to the terminal device by using signaling; and correspondingly, receiving, by the terminal device, the reference information sent by the network device.

In an optional embodiment, the signaling is any one of the following signaling: radio resource control RRC signaling, downlink control information (DCI) signaling, and a Media Access Control control element (MAC CE) signaling.

Specifically, the signaling that is used to carry the reference information and that is sent by the network device to the terminal device may be radio resource control (RRC) signaling, may be downlink control information (DCI), or may be Media Access Control (MAC) layer control element (CE) signaling. This is not limited in this embodiment of this application.

It should be understood that, using the RRC signaling to configure the reference information is applicable to a scenario in which the configuration of the reference information does not frequently change and is relatively stable, and bit overheads of signaling of a physical layer and a MAC layer may be greatly reduced. Using the DCI to configure the reference information helps the terminal device perform fast detection, to ensure that the terminal device receives the reference information in a timely manner. However, using the MAC CE signaling to configure the reference information is applicable to a scenario in which the reference information changes relatively dynamically. A decoding speed of the MAC CE signaling is higher than that of the RRC signaling. Therefore, in such a scenario, the network device uses the MAC CE signaling to configure the reference information more efficiently.

It should be understood that, sequence numbers of the foregoing processes do not indicate an execution sequence, and an execution sequence of the processes shall be determined based on functions and internal logic thereof, and shall constitute no limitation on an implementation process of the embodiments of this application.

The data transmission method according to the embodiments of this application is described in detail above with reference to FIG. 1 and FIG. 2, and a terminal device and a network device according to the embodiments of this application are described in detail below with reference to FIG. 3 to FIG. 6.

Figure 3:
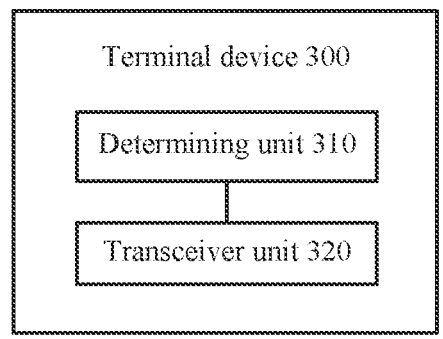
FIG. 3 is a schematic block diagram of a terminal device according to an embodiment of this application.

FIG. 3 shows a terminal device 300 provided in an embodiment of this application. The terminal device 300 includes: a determining unit 310 and a transceiver unit 320.

The determining unit 310 is configured to determine reference information, and the transceiver unit 320 is configured to send second channel state information (CSI) based on a comparison result of the reference information and a status parameter, where the second CSI includes all parameters in first CSI or includes some parameters in the first CSI, the first CSI is CSI that needs to be reported and that is configured by a network device for the terminal device, and the status parameter includes at least one of a transmission parameter of uplink data, a parameter in the first CSI, and a transmission parameter of the first CSI.

In this embodiment of this application, after determining, based on the reference information and the CSI that needs to be reported and that is configured by the network device for the terminal device, CSI that can be actually reported, the terminal device reports the CSI, so that the terminal device can properly use a limited uplink channel resource allocated by the network device to the terminal device, thereby improving transmission performance of the CSI.

Optionally, the reference information is used to indicate at least one of a threshold of a rank indication (RI) and a threshold of a transmission parameter of the second CSI, where the transmission parameter of the second CSI includes at least one of the following parameters: a quantity of resource elements (REs) occupied by the second CSI on an uplink channel, a quantity of modulation symbols of the second CSI, an information bit quantity of the second CSI, and a bit quantity of the second CSI after channel coding is performed.

Optionally, the reference information is used to indicate the threshold of the RI, and the status parameter is an RI in the first CSI; and if the RI in the first CSI is greater than the threshold of the RI, the second CSI includes some parameters in the first CSI, or if the RI in the first CSI is less than or equal to the threshold of the RI, the second CSI includes all parameters in the first CSI.

Optionally, the reference information is used to indicate a first threshold of the quantity of REs occupied by the second CSI on the uplink channel, and the status parameter is a quantity of REs occupied by the first CSI on the uplink channel; and if the quantity of REs occupied by the first CSI on the uplink channel is greater than the first threshold, the second CSI includes some parameters in the first CSI, or if the quantity of REs occupied by the first CSI on the uplink channel is less than or equal to the first threshold, the second CSI includes all parameters in the first CSI.

Optionally, the reference information is used to indicate a second threshold of the quantity of modulation symbols of the second CSI, and the status parameter is a quantity of modulation symbols of the first CSI; and if the quantity of modulation symbols of the first CSI is greater than the second threshold, the second CSI includes some parameters in the first CSI, or if the quantity of modulation symbols of the first CSI is less than or equal to the second threshold, the second CSI includes all parameters in the first CSI.

Optionally, the reference information is used to indicate a third threshold of the information bit quantity of the second CSI, and the status parameter is an information bit quantity of the first CSI; and if the information bit quantity of the first CSI is greater than the third threshold, the second CSI includes some parameters in the first CSI, or if the information bit quantity of the first CSI is less than or equal to the third threshold, the second CSI includes all parameters in the first CSI.

Optionally, the reference information is used to indicate a fourth threshold of the bit quantity of the second CSI after channel coding is performed, and the status parameter is a bit quantity of the first CSI after channel coding is performed; and if the bit quantity of the first CSI after channel coding is performed is greater than the fourth threshold, the second CSI includes some parameters in the first CSI, or if the bit quantity of the first CSI after channel coding is performed is less than or equal to the fourth threshold, the second CSI includes all parameters in the first CSI.

Optionally, the transceiver unit 320 is specifically configured to: send the second CSI and the uplink data, where the uplink data and the second CSI are carried on a same uplink channel.

Optionally, the transmission parameter of the second CSI further includes: a ratio of the quantity of REs occupied by the second CSI on the uplink channel to a total quantity of REs included in the uplink channel.

Optionally, the reference information is used to indicate a fifth threshold of the ratio of the quantity of REs occupied by the second CSI on the uplink channel to the total quantity of REs included in the uplink channel, and the status parameter is a ratio of a quantity of REs occupied by the first CSI on the uplink channel to the total quantity of REs included in the uplink channel; and if the ratio of the quantity of REs occupied by the first CSI on the uplink channel to the total quantity of REs included in the uplink channel is greater than the fifth threshold, the second CSI includes some parameters in the first CSI, or if the ratio of the quantity of REs occupied by the first CSI on the uplink channel to the total quantity of REs included in the uplink channel is less than or equal to the fifth threshold, the second CSI includes all parameters in the first CSI.

Optionally, the reference information is used to indicate a threshold of the transmission parameter of the uplink data; and the transmission parameter of the uplink data includes at least one of the following parameters: a channel coding code rate of the uplink data, a quantity of REs occupied by the uplink data on the uplink channel, a quantity of modulation symbols of the uplink data, and a ratio of the quantity of REs occupied by the uplink data on the uplink channel to the total quantity of REs included in the uplink channel.

Optionally, the reference information is used to indicate a sixth threshold of the channel coding code rate of the uplink data, and the status parameter is the channel coding code rate of the uplink data; and if the channel coding code rate of the uplink data is greater than the sixth threshold, the second CSI includes some parameters in the first CSI, or if the channel coding code rate of the uplink data is less than or equal to the sixth threshold, the second CSI includes all parameters in the first CSI.

Optionally, the reference information is used to indicate a seventh threshold of the quantity of REs occupied by the uplink data on the uplink channel, and the status parameter is the quantity of REs occupied by the uplink data on the uplink channel; and if the quantity of REs occupied by the uplink data on the uplink channel is less than the seventh threshold, the second CSI includes some parameters in the first CSI, or if the quantity of REs occupied by the uplink data on the uplink channel is greater than or equal to the seventh threshold, the second CSI includes all parameters in the first CSI.

Optionally, the reference information is used to indicate an eighth threshold of the quantity of modulation symbols of the uplink data, and the status parameter is the quantity of modulation symbols of the uplink data; and if the quantity of modulation symbols of the uplink data is less than the eighth threshold, the second CSI includes some parameters in the first CSI, or if the quantity of modulation symbols of the uplink data is greater than or equal to the eighth threshold, the second CSI includes all parameters in the first CSI.

Optionally, the reference information is used to indicate a ninth threshold of the ratio of the quantity of REs occupied by the uplink data on the uplink channel to the total quantity of REs included in the uplink channel, and the status parameter is the ratio of the quantity of REs occupied by the uplink data on the uplink channel to the total quantity of REs included in the uplink channel; and if the ratio of the quantity of REs occupied by the uplink data on the uplink channel to the total quantity of REs included in the uplink channel is less than the ninth threshold, the second CSI includes some parameters in the first CSI, or if the ratio of the quantity of REs occupied by the uplink data on the uplink channel to the total quantity of REs included in the uplink channel is greater than or equal to the ninth threshold, the second CSI includes all parameters in the first CSI.

Optionally, the determining unit 310 is further configured to: before the second CSI is sent, determine, based on the comparison result and priority information, whether the uplink data is to be sent, where the priority information is used to indicate priorities of the second CSI and the uplink data; and the transceiver unit 320 is specifically configured to: send the second CSI and the uplink data if it is determined that the uplink data is to be sent.

Optionally, the parameter in the first CSI includes: second frequency domain granularity parameters of M subbands and a first frequency domain granularity parameter, where the first frequency domain granularity parameter includes an RI, and the second frequency domain granularity parameters of the M subbands include a channel quality indicator (CQI) of each of the M subbands and/or a precoding matrix indicator (PMI) of the subband; and a parameter in the second CSI includes any one of the following: second frequency domain granularity parameters of N subbands and the first frequency domain granularity parameter; all or part of second frequency domain granularity parameters of each of the M subbands and the first frequency domain granularity parameter; and the first frequency domain granularity parameter, the CQI of each of the M subbands, and a PMI of each of the N subbands, where the M subbands include the N subbands, both M and N are integers greater than or equal to 1, and M is greater than N.

Optionally, the reference information is predefined, or the reference information is configured by the network device for the terminal device by using signaling.

Optionally, the signaling is any one of the following signaling: radio resource control RRC signaling, downlink control information (DCI) signaling, and a Media Access Control control element (MAC CE) signaling.

It should be understood that, the terminal device 300 herein is embodied in a form of a functional unit. The term "unit" herein may be an application-specific integrated circuit (ASIC), an electronic circuit, a processor (for example, a shared processor, a dedicated processor, or a group processor) configured to execute one or more software or firmware programs, a memory, a merging logic circuit, and/or another appropriate component supporting the described function. In an optional example, a person skilled in the art may understand that, the terminal device 300 may be specifically the terminal device in the foregoing embodiment, and the terminal device 300 may be configured to perform procedures and/or steps corresponding to the terminal device in the foregoing method embodiment. To avoid repetition, details are not described herein again.

Figure 4:
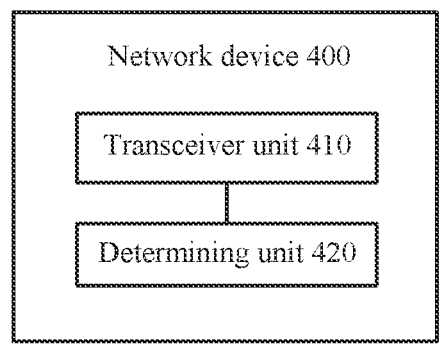
FIG. 4 is a schematic block diagram of a network device according to an embodiment of this application.

FIG. 4 shows a network device 400 provided in an embodiment of this application. The network device 400 includes: a transceiver unit 410 and a determining unit 420.

The transceiver unit 410 is configured to receive a rank indication (RI) in second CSI; and the determining unit 420 is configured to determine, based on a comparison result obtained by comparing a status parameter with reference information, at least one of a bit quantity of the second CSI and a quantity of resource elements (REs) occupied by the second CSI on an uplink channel, where the status parameter is determined based on the RI, the status parameter includes at least one of a transmission parameter of uplink data, a parameter in first CSI, and a transmission parameter of the first CSI, the first CSI is CSI that needs to be reported and that is configured by the network device for a terminal device, and the second CSI includes all parameters in the first CSI or includes some parameters in the first CSI.

In this embodiment of this application, the network device receives the second CSI reported by the terminal device, and the second CSI is reported after the terminal device determines, based on the reference information and the CSI that needs to be reported and that is configured by the network device for the terminal device, CSI that can be actually reported, so that the terminal device can properly use a limited uplink channel resource allocated by the network device to the terminal device, thereby improving transmission performance of the CSI.

Optionally, the reference information is used to indicate at least one of a threshold of the rank indication (RI) of the second CSI and a threshold of a transmission parameter of the second CSI, where the transmission parameter of the second CSI includes at least one of the following parameters: the quantity of resource elements (REs) occupied by the second CSI on the uplink channel, a quantity of modulation symbols of the second CSI, an information bit quantity of the second CSI, and a bit quantity of the second CSI after channel coding is performed.

Optionally, the reference information is used to indicate the threshold of the RI, and the status parameter is the RI; and if the RI is greater than the threshold of the RI, the second CSI includes some parameters in the first CSI; or if the RI is less than or equal to the threshold of the RI, the second CSI includes all parameters in the first CSI.

Optionally, the reference information is used to indicate a first threshold of the quantity of REs occupied by the second CSI on the uplink channel, and the status parameter is a quantity of REs occupied by the first CSI on the uplink channel; and if the quantity of REs occupied by the first CSI on the uplink channel is greater than the first threshold, the second CSI includes some parameters in the first CSI, or if the quantity of REs occupied by the first CSI on the uplink channel is less than or equal to the first threshold, the second CSI includes all parameters in the first CSI.

Optionally, the reference information is used to indicate a second threshold of the quantity of modulation symbols of the second CSI, and the status parameter is a quantity of modulation symbols of the first CSI; and if the quantity of modulation symbols of the first CSI is greater than the second threshold, the second CSI includes some parameters in the first CSI, or if the quantity of modulation symbols of the first CSI is less than or equal to the second threshold, the second CSI includes all parameters in the first CSI.

Optionally, the reference information is used to indicate a third threshold of the information bit quantity of the second CSI, and the status parameter is an information bit quantity of the first CSI; and if the information bit quantity of the first CSI is greater than the third threshold, the second CSI includes some parameters in the first CSI, or if the information bit quantity of the first CSI is less than or equal to the third threshold, the second CSI includes all parameters in the first CSI.

Optionally, the reference information is used to indicate a fourth threshold of the bit quantity of the second CSI after channel coding is performed, and the status parameter is a bit quantity of the first CSI after channel coding is performed; and if the bit quantity of the first CSI after channel coding is performed is greater than the fourth threshold, the second CSI includes some parameters in the first CSI, or if the bit quantity of the first CSI after channel coding is performed is less than or equal to the fourth threshold, the second CSI includes all parameters in the first CSI.

Optionally, the transceiver unit 410 is specifically configured to: receive the second CSI and the uplink data, where the uplink data and the second CSI are carried on a same uplink channel.

Optionally, the transmission parameter of the second CSI further includes: a ratio of the quantity of REs occupied by the second CSI on the uplink channel to a total quantity of REs included in the uplink channel.

Optionally, the reference information is used to indicate a fifth threshold of the ratio of the quantity of REs occupied by the second CSI on the uplink channel to the total quantity of REs included in the uplink channel, and the status parameter is a ratio of a quantity of REs occupied by the first CSI on the uplink channel to the total quantity of REs included in the uplink channel; and if the ratio of the quantity of REs occupied by the first CSI on the uplink channel to the total quantity of REs included in the uplink channel is greater than the fifth threshold, the second CSI includes some parameters in the first CSI, or if the ratio of the quantity of REs occupied by the first CSI on the uplink channel to the total quantity of REs included in the uplink channel is less than or equal to the fifth threshold, the second CSI includes all parameters in the first CSI.

Optionally, the reference information is used to indicate a threshold of the transmission parameter of the uplink data; and the transmission parameter of the uplink data includes at least one of the following parameters: a channel coding code rate of the uplink data, a quantity of REs occupied by the uplink data on the uplink channel, a quantity of modulation symbols of the uplink data, and a ratio of the quantity of REs occupied by the uplink data on the uplink channel to a total quantity of REs included in the uplink channel.

Optionally, the reference information is used to indicate a sixth threshold of the channel coding code rate of the uplink data, and the status parameter is the channel coding code rate of the uplink data; and if the channel coding code rate of the uplink data is greater than the sixth threshold, the second CSI includes some parameters in the first CSI, or if the channel coding code rate of the uplink data is less than or equal to the sixth threshold, the second CSI includes all parameters in the first CSI.

Optionally, the reference information is used to indicate a seventh threshold of the quantity of REs occupied by the uplink data on the uplink channel, and the status parameter is the quantity of REs occupied by the uplink data on the uplink channel; and if the quantity of REs occupied by the uplink data on the uplink channel is less than the seventh threshold, the second CSI includes some parameters in the first CSI, or if the quantity of REs occupied by the uplink data on the uplink channel is greater than or equal to the seventh threshold, the second CSI includes all parameters in the first CSI.

Optionally, the reference information is used to indicate an eighth threshold of the quantity of modulation symbols of the uplink data, and the status parameter is the quantity of modulation symbols of the uplink data; and if the quantity of modulation symbols of the uplink data is less than the eighth threshold, the second CSI includes some parameters in the first CSI, or if the quantity of modulation symbols of the uplink data is greater than or equal to the eighth threshold, the second CSI includes all parameters in the first CSI.

Optionally, the reference information is used to indicate a ninth threshold of the ratio of the quantity of REs occupied by the uplink data on the uplink channel to the total quantity of REs included in the uplink channel, and the status parameter is the ratio of the quantity of REs occupied by the uplink data on the uplink channel to the total quantity of REs included in the uplink channel; and if the ratio of the quantity of REs occupied by the uplink data on the uplink channel to the total quantity of REs included in the uplink channel is less than the ninth threshold, the second CSI includes some parameters in the first CSI, or if the ratio of the quantity of REs occupied by the uplink data on the uplink channel to the total quantity of REs included in the uplink channel is greater than or equal to the ninth threshold, the second CSI includes all parameters in the first CSI.

Optionally, the parameter in the first CSI includes: second frequency domain granularity parameters of M subbands and a first frequency domain granularity parameter, where the first frequency domain granularity parameter includes an RI, and the second frequency domain granularity parameters of the M subbands include a channel quality indicator (CQI) of each of the M subbands and/or a precoding matrix indicator (PMI) of the subband; and a parameter in the second CSI includes any one of the following: second frequency domain granularity parameters of N subbands and the first frequency domain granularity parameter; all or part of second frequency domain granularity parameters of each of the M subbands and the first frequency domain granularity parameter; and the first frequency domain granularity parameter, the CQI of each of the M subbands, and a PMI of each of the N subbands, where the M subbands include the N subbands, both M and N are integers greater than or equal to 1, and M is greater than N.

Optionally, the reference information is predefined, or the transceiver unit 410 is further configured to: send the reference information to the terminal device by using signaling.

Optionally, the signaling is any one of the following signaling: radio resource control RRC signaling, downlink control information (DCI) signaling, and a Media Access Control control element (MAC CE) signaling.

It should be understood that, the network device 400 herein is embodied in a form of a functional unit. The term "unit" herein may be an application-specific integrated circuit (ASIC), an electronic circuit, a processor (for example, a shared processor, a dedicated processor, or a group processor) configured to execute one or more software or firmware programs, a memory, a merging logic circuit, and/or another appropriate component supporting the described function. In an optional example, a person skilled in the art may understand that, the network device 400 may be specifically the network device in the foregoing embodiment, and the network device 400 may be configured to perform procedures and/or steps corresponding to the network device in the foregoing method embodiment. To avoid repetition, details are not described herein again.

Figure 5:
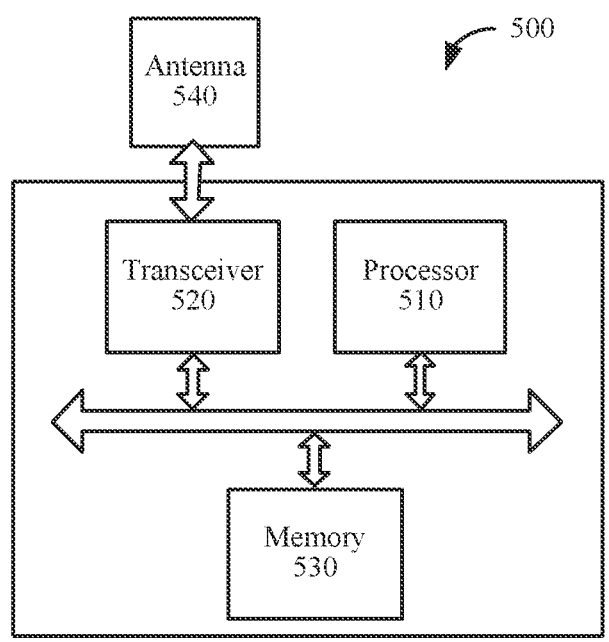
FIG. 5 is a schematic block diagram of another network device according to an embodiment of this application.

FIG. 5 shows another network device 500 provided in an embodiment of this application. The network device 500 includes a processor 510 and a transceiver 520, and optionally, the network device 500 may further include a memory 530. The processor 510, the transceiver 520, and the memory 530 communicate with each other by using an internal connection path, the memory 530 is configured to store an instruction, and the processor 510 is configured to execute the instruction stored in the memory 530, so as to control the transceiver 520 to send a signal and/or receive a signal.

When the program instruction stored in the memory 530 is executed by the processor 510, the processor 510 is configured to receive a rank indication (RI) in second CSI by using the transceiver 520; and determine, based on a comparison result obtained by comparing the status parameter with the reference information, at least one of a bit quantity of the second CSI and a quantity of resource elements (REs) occupied by the second CSI on an uplink channel, where the status parameter is determined based on the RI, the status parameter includes at least one of a transmission parameter of uplink data, a parameter in first CSI, and a transmission parameter of the first CSI, the first CSI is CSI that needs to be reported and that is configured by the network device for a terminal device, and the second CSI includes all parameters in the first CSI or includes some parameters in the first CSI.

The processor 510 and the memory 530 may be combined into a processing apparatus, and the processor 510 is configured to execute program code stored in the memory 530 to implement the foregoing function. During specific implementation, the memory 530 may be integrated in the processor 510, or may be independent of the processor 510.

The network device 500 may further include an antenna 540, configured to send, by using a radio signal, downlink data or downlink control signaling output by the transceiver 520. It should be understood that, the network device 500 may be specifically the network device in the data transmission method 200, and may be configured to perform steps and/or procedures corresponding to the network device in the data transmission method 200. Optionally, the memory 530 may include a read-only memory and a random access memory, and provide an instruction and data for the processor. A part of the memory may further include a nonvolatile random access memory. For example, the memory may further store information about a device type. The processor 510 may be configured to execute the instruction stored in the memory, and when the processor 510 executes the instruction stored in the memory, the processor 510 is configured to perform steps and/or procedures of the method embodiment corresponding to the network device.

Figure 6:
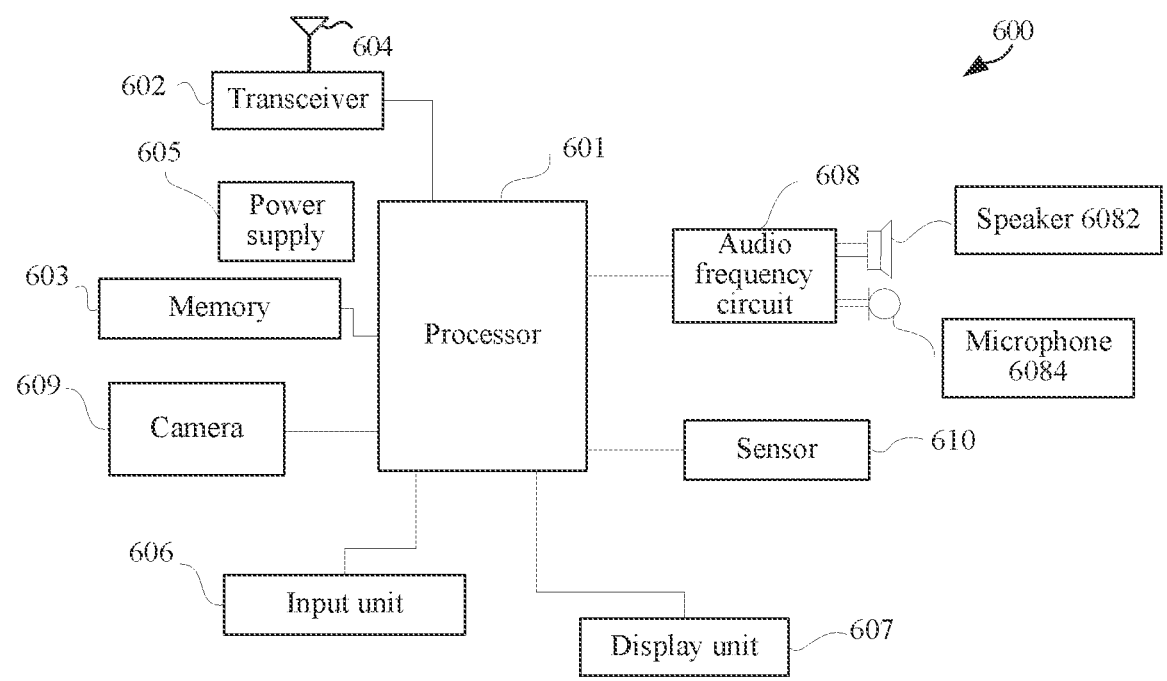
FIG. 6 is a schematic block diagram of another terminal device according to an embodiment of this application.

FIG. 6 shows another terminal device 600 provided in an embodiment of this application. As shown in FIG. 6, the terminal device 600 includes a processor 601 and a transceiver 602, and optionally, the terminal device 600 further includes a memory 603. The processor 601, the transceiver 602, and the memory 603 communicate with each other by using an internal connection path, to transfer a control signal and/or a data signal, the memory 603 is configured to store a computer program, and the processor 601 is configured to invoke the computer program from the memory 603 and run the computer program, so as to control the transceiver 602 to receive/transmit a signal.

When a program instruction stored in the memory 603 is executed by the processor 601, the processor 601 is configured to determine reference information; and send, by using the transceiver 602, second channel state information (CSI) based on a comparison result of the reference information and a status parameter, where the second CSI includes all parameters in first CSI or includes some parameters in the first CSI, the first CSI is CSI that needs to be reported and that is configured by a network device for the terminal device, and the status parameter includes at least one of a transmission parameter of uplink data, a parameter in the first CSI, and a transmission parameter of the first CSI.

The processor 601 and the memory 603 may be combined into a processing apparatus, and the processor 601 is configured to execute program code stored in the memory 603 to implement the foregoing function. During specific implementation, the memory 603 may be integrated in the processor 601, or may be independent of the processor 601. The terminal device 600 may further include an antenna 604, configured to send, by using a radio signal, uplink data or uplink control signaling output by the transceiver 602.

It should be understood that, the terminal device 600 may be specifically the terminal device in the data transmission method 200, and may be configured to perform steps and/or procedures corresponding to the terminal device in the data transmission method 200. Optionally, the memory 630 may include a read-only memory and a random access memory, and provide an instruction and data for the processor. A part of the memory may further include a non-volatile random access memory. For example, the memory may further store information about a device type. The processor 601 may be configured to execute the instruction stored in the memory, and when the processor 601 executes the instruction stored in the memory, the processor 601 is configured to perform steps and/or procedures of the method embodiment corresponding to the terminal device.

The processor 601 may be configured to perform an action that is internally implemented by a terminal and that is described in the foregoing method embodiment, and the transceiver 602 may be configured to perform an action of transmission or sending that is performed by the terminal to the terminal device and that is described in the foregoing method embodiment. For details, refer to the description in the foregoing method embodiment. Details are not described herein again.

The terminal device 600 may further include a power supply 606, configured to supply power to various devices or circuits in the terminal device 600.

In addition, to improve functions of the terminal device, the terminal device 600 may further include one or more of an input unit 606, a display unit 607, an audio frequency circuit 608, a camera 609, a sensor 610, and the like, and the audio frequency circuit may further include a speaker 6082, a microphone 6084, and the like.

It should be understood that in the embodiments of this application, the processor in the network device 500 and the terminal device 600 may be a central processing unit (CPU), or the processor may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

In an implementation process, steps in the foregoing methods may be implemented by using a hardware integrated logic circuit in the processor, or by using an instruction in a form of software. The steps of the methods disclosed with reference to the embodiments of this application may be directly performed by a hardware processor, or may be performed by using a combination of hardware in the processor and a software unit. The software unit may be located in a mature storage medium in the art, such as a random access memory, a flash memory, a read-only memory, a programmable read-only memory, an electrically erasable programmable memory, or a register. The storage medium is located in the memory, and the processor reads an instruction in the memory and performs the steps in the foregoing methods in combination with hardware of the processor. To avoid repetition, details are not described herein again.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment based on functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts shown as units may or may not be physical units, may be located in one position, or may be distributed on a plurality of network units. Some or all of the units may be selected depending on actual requirements to achieve the objectives of the solutions of the embodiments in this application.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or part of the technical solutions may be implemented in a form of a software product. The computer software product is stored in a storage medium and includes several instructions for instructing a computer device (which may be a personal computer, a server, a network device, or the like) to perform all or part of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

The invention claimed is:

1. A data transmission method, comprising:
   receiving, by a terminal device, radio resource control (RRC) signaling from a network device;
   determining, by the terminal device based on reference information comprised in the RRC signaling, a threshold of a quantity of modulation symbols for carrying channel state information (CSI) of a bandwidth part on a physical uplink shared channel (PUSCH); and
   sending, by the terminal device, all or a portion of parameters in CSI configured by the network device to be reported for the bandwidth part, based on a comparison result of a quantity of modulation symbols for carrying the CSI configured by the network device to be reported for the bandwidth part and the threshold.

2. The method according to claim 1, wherein sending all or a portion of the parameters in the CSI comprises sending the portion of the parameters in the CSI in response to the quantity of modulation symbols for carrying the CSI configured by the network device to be reported for the bandwidth part being greater than the threshold.

3. The method according to claim 2, wherein the portion of the parameters in the CSI is absent of subband pre-coding matrix indicators (PMIs) corresponding to a proportion of subbands of the bandwidth part.

4. The method according to claim 2, wherein the portion of the parameters in the CSI comprises:
   wideband PMI, subband PMIs corresponding to a proportion of subbands of the bandwidth part, and channel quality indicators (CQIs) corresponding to all subbands of the bandwidth part.

5. A data transmission method, comprising:
   sending, by a network device to a terminal device, radio resource control (RRC) signaling that comprises reference information for determining a threshold of a quantity of modulation symbols for carrying channel state information (CSI) of bandwidth part on a physical shared channel (PUSCH); and
   determining, by the network device, all or a portion of parameters in CSI configured by the network device to be reported for the bandwidth part are reported, based on a comparison result of a quantity of modulation symbols for carrying the CSI configured by the network device to be reported for the bandwidth part and the threshold.

6. The method according to claim 5, wherein determining, by the network device, all or a portion of the parameters in the CSI comprises determining by the network device, the portion of the parameters in the CSI are reported in response to the quantity of modulation symbols for carrying the CSI configured by the network device to be reported for the bandwidth part being greater than the threshold.

7. The method according to claim 6, wherein the portion of the parameters in the CSI is absent of subband pre-coding matrix indicators (PMIs) corresponding to a proportion of subbands of the bandwidth part.

8. The method according to claim 6, wherein the portion of the parameters in the CSI comprises:
   wideband PMI, subband PMIs corresponding to a proportion of subbands of the bandwidth part and channel quality indicators (CQIs) corresponding to all subbands of the bandwidth part.

9. A processing apparatus, comprising:
   at least one processor; and
   one or more memories coupled to the at least one processor and storing programming instructions for execution by the at least one processor to:
   receive, radio resource control (RRC) signaling from a network device;
   determine, based on reference information comprised in the RRC signaling, a threshold of a quantity of modulation symbols for carrying channel state information (CSI) of a bandwidth part on a physical uplink shared channel (PUSCH); and
   send, all or a portion of parameters in CSI configured by the network device to be reported for the bandwidth part, based on a comparison result of a quantity of modulation symbols for carrying the CSI configured by the network device to be reported for the bandwidth part and the threshold.

10. The processing apparatus according to claim 9, wherein sending all or a portion of the parameters in the CSI comprises sending the portion of the parameters in the CSI in response to the quantity of modulation symbols for carrying the CSI configured by the network device to be reported for the bandwidth part being greater than the threshold.

11. The processing apparatus according to claim 10, wherein the portion of the parameters in the CSI is absent of subband pre-coding matrix indicators (PMIs) corresponding to a proportion of subbands of the bandwidth part.

12. The processing apparatus according to claim 10, wherein the portion of the parameters in the CSI comprises:
   wideband PMI, subband PMIs corresponding to a proportion of subbands of the bandwidth part and channel quality indicators (CQIs) corresponding to all subbands of the bandwidth part.

13. A processing apparatus, comprising:
   at least one processor; and
   one or more memories coupled to the at least one processor and storing programming instructions for execution by the at least one processor to:
   send, to a terminal device, radio resource control (RRC) signaling that comprises reference information for determining a threshold of a quantity of modulation symbols for carrying channel state information (CSI) of bandwidth part on a physical shared channel (PUSCH); and
   determine, all or a portion of parameters in CSI configured by the processing apparatus to be reported for the bandwidth part are reported, based on a comparison result of a quantity of modulation symbols for carrying the CSI configured by the processing apparatus to be reported for the bandwidth part and the threshold.

14. The processing apparatus according to claim 13, wherein determine, all or a portion of the parameters in the CSI comprises determine, the portion of the parameters in the CSI are reported in response to the quantity of modulation symbols for carrying the CSI configured by the processing apparatus to be reported for the bandwidth part being greater than the threshold.

15. The processing apparatus according to claim 14, wherein the portion of the parameters in the CSI is absent of subband pre-coding matrix indicators (PMIs) corresponding to a proportion of subbands of the bandwidth part.

16. The processing apparatus according to claim 14, wherein the portion of the parameters in the CSI comprises:
wideband PMI, subband PMIs corresponding to a proportion of subbands of the bandwidth part and channel quality indicators (CQIs) corresponding to all subbands of the bandwidth part.

* * * * *

UNITED STATES PATENT AND TRADEMARK OFFICE
CERTIFICATE OF CORRECTION

| | | |
|---|---|---|
| PATENT NO. | : 11,736,170 B2 | Page 1 of 1 |
| APPLICATION NO. | : 17/745349 | |
| DATED | : August 22, 2023 | |
| INVENTOR(S) | : Xueru Li and Ruiqi Zhang | |

It is certified that error appears in the above-identified patent and that said Letters Patent is hereby corrected as shown below:

In the Claims

In Column 45, In Line 50, Claim 5, after "physical" insert -- uplink --.

In Column 45, In Line 61, Claim 6, delete "determining" and insert -- determining, --.

In Column 46, In Line 54, Claim 13, after "physical" insert -- uplink --.

Signed and Sealed this
Nineteenth Day of March, 2024

Katherine Kelly Vidal
*Director of the United States Patent and Trademark Office*